(12) United States Patent
Xian et al.

(10) Patent No.: US 10,158,612 B2
(45) Date of Patent: Dec. 18, 2018

(54) IMAGING-BASED AUTOMATIC DATA EXTRACTION WITH SECURITY SCHEME

(71) Applicant: Hand Held Products, Inc., Fort Mill, SC (US)

(72) Inventors: Tao Xian, Mount Laurel, NJ (US); Stephen J. Colavito, Garnet Valley, PA (US); Larry E. Ramsey-Macomber, Fairport, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/426,162

(22) Filed: Feb. 7, 2017

(65) Prior Publication Data
US 2018/0227274 A1    Aug. 9, 2018

(51) Int. Cl.
*H04L 29/06*    (2006.01)
*G06K 19/06*    (2006.01)
(Continued)

(52) U.S. Cl.
CPC ........ *H04L 63/0428* (2013.01); *G06K 7/1417* (2013.01); *G06K 19/06037* (2013.01); *H04L 9/14* (2013.01)

(58) Field of Classification Search
CPC . H04L 63/04; H04L 63/0407; H04L 63/0414; H04L 63/0428; H04L 63/0435;
(Continued)

(56) References Cited

U.S. PATENT DOCUMENTS

| 5,388,158 A | 2/1995 | Berson |
|---|---|---|
| 6,832,725 B2 | 12/2004 | Gardiner et al. |

(Continued)

FOREIGN PATENT DOCUMENTS

| WO | 2013163789 A1 | 11/2013 |
|---|---|---|
| WO | 2013173985 A1 | 11/2013 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Ayoub Alata
(74) *Attorney, Agent, or Firm* — Additon, Higgins & Pendleton, P.A.

(57) ABSTRACT

A system and method for secure data transfer between two secure computer systems via display-based transfer in geometric form. A first computer network stores alphanumeric data. The alphanumeric data is encoded into a geometric data form, such as a bar code or matrix code representation or other non-text, non-numeric data form suitable for visual display. The bar code or matrix code, or other geometric data form, is displayed on a display monitor connected to the first computer network. The system and method then receives the displayed geometric data form on a second computer network. The second computer network has a camera which obtains a view of the bar code, matrix code, or other geometric data representation. The second computer network then decodes the geometric data representation to restore the data to its native form (such as text or numbers). The second computer network then stores the retrieved data.

20 Claims, 6 Drawing Sheets

(51) Int. Cl.
*G06K 7/14* (2006.01)
*H04L 9/14* (2006.01)

(58) Field of Classification Search
CPC ..... H04L 63/0442; H04L 9/14; G06K 7/1417; G06K 19/06037
See application file for complete search history.

(56) References Cited

U.S. PATENT DOCUMENTS

| | | | |
|---|---|---|---|
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,499,567 B2 | 3/2009 | Shimosato |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Batten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,861,724 B2 | 10/2014 | Weis et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |

(56) References Cited

U.S. PATENT DOCUMENTS

| | | |
|---|---|---|
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,213,931 B1* | 12/2015 | Annan ............... G06K 19/06 |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 9,680,955 B1* | 6/2017 | Kinnaman ......... H04L 67/2842 |
| 2006/0088166 A1 | 4/2006 | Karusawa |
| 2007/0063048 A1 | 3/2007 | Havens et al. |
| 2009/0134221 A1 | 5/2009 | Zhu et al. |
| 2010/0041457 A1* | 2/2010 | Cook ............... A63F 13/12 463/16 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |

(56) References Cited

U.S. PATENT DOCUMENTS

| | | |
|---|---|---|
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117581 A1* | 4/2016 | Ortega .................. G06Q 10/20 235/375 |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |

(56) References Cited

U.S. PATENT DOCUMENTS

2016/0306769 A1 10/2016 Kohtz et al.
2016/0314276 A1 10/2016 Sewell et al.
2016/0314294 A1 10/2016 Kubler et al.

FOREIGN PATENT DOCUMENTS

WO 2014019130 A1 2/2014
WO 2014110495 A1 7/2014

OTHER PUBLICATIONS

U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch For a Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
Maria Montoya Freire, Visual wireless communications with smartphones, Master's Thesis, Aalto University, dated Aug. 10, 2015, 63 pages.
Zapya 4.0 Tutorial: Use the QR Code to Transfer Files Youtube video, found at https://www.youtube.com/watch?v=wFOSjEM9jUo; published May 16, 2016; 2 pages.
Joe Casabona, Transfer Files Though QR Codes with Scansfer, dated May 18, 2011, downloaded from https://android.appstorm.net/reviews/utilities/transfer-files-through-qr-codes-with-scansfer/ on Sep. 19, 2019, 8 pages.
Ajini Asok et al., QR Code Based Data Transmission in Mobile Devices Using AES Encryption, published in the International Journal of Science and Research (IJSR), vol. 5 Issue 6, Jun. 2016, (Paper ID: NOV164419; ISSN (Online): 2319-7064), 5 pages [Downloaded Sep. 19, 2018 from https://www.ijsr.net/archive/v5i6/NOV164419.pdf].

* cited by examiner

FIG. 2 Data Transfer – Optical/Imaging Based

IMAGING-BASED AUTOMATIC DATA EXTRACTION WITH SECURITY SCHEME

FIELD OF THE INVENTION

The present invention relates to a method and apparatus for secure data communications; and more particularly, to a method and apparatus for secure data transfer between two proprietary computer networks without the use of a wired connection, without the use of a wireless (RF) connection, and without the use of a portable hardware data storage/transfer device (such as a USB drive or other portable, non-volatile memory device).

BACKGROUND

The completely private transfer of data between authorized parties in security sensitive-environments—such as defense and military contexts, but also many other corporate and government contexts as well—is often critical to effective organizational operations and security.

"Data" or "written documents" as understood herein may be broadly understood to include not only prose documents but also databases, spreadsheets, and other structured data. Such documents may pertain to many areas, including: policy data, organizational planning and strategy, organizational history, budgets and other financial information, sensitive information on competitors or enemies (or even on allies and partners), personnel data, technical device parameters and data, information about equipment design or usage, electronic or mechanical system maintenance records, organizational resource storage and allocation data, and much other information. The exposure of such documents and their data to unauthorized third-parties can cause significant or serious harm to many organizations.

Disadvantages of Conventional Data Transfer: With reference to FIG. 1, it is well-known that conventional network connections 170/190 between computers are subject to a variety of potential security threats, which may allow unauthorized users to have inappropriate access to stored data or even to modify the use and operations of a computer system. Threats to computer networks include direct wiretapping (intercepting the flow of data over wired connections), port scans, idle scans, denial of service attacks, DNS spoofing, man-in-the-middle attacks, phishing, the use of computer viruses to infect and control a computer system, and many others as well.

Most such attacks are dependent, directly or indirectly, on the existence of a direct data connection between two computer systems or networks. Such connections are often of the forms of exemplary conventional data transfer paths 170, such as radio frequency (RF) or microwave wireless connections 170.1, infrared wireless connections (not illustrated in the figures), wired connections 170.2 (such as USB cables or Ethernet cables), optical-fiber cable connections (not illustrated in the figures), cloud connections 170.3; and also in the form of data transfer media 190. For purposes of this document, both optical-fiber connections and infrared connections will be understood to be subsumed under conventional data transfer paths 170.

Most such generalized connections (RF/microwave 170.1, wired 170.2, cloud 170.3, optical-fiber, and infrared) provide a generalized path for distribution of data or data packets with multiple types of content and from multiple sources. That is, any data which conforms to suitable protocols (for example, TCP/IP) can be carried over such conventional data transfer paths 170, and the data can potentially come from many different sources (for example, any computer with access to the data transfer path 170).

Various security measures, well known in the art, are employed to ensure computer security. These include password protection schemes, biometric user verification, "real person" authentication schemes (for example, CAPTCHA and other challenge-response tests used to distinguish human users from automated "users"), and other authentication schemes. Firewalls are used to control access to specific services and ports. Encryption is employed to ensure that even if data is intercepted, the data can only be de-encrypted and used by authorized users with access to appropriate digital security keys. Other security measures may be employed as well.

Nonetheless, conventional data transfer paths 170 are often essentially open data highways (at least at the physical level); for example, anyone with adequate hardware can monitor and broadcast over radio waves and generally over cloud media), which can potentially be accessed by multiple users, including malevolent users.

Data transfer media 190, such as disk drives, DVDs, and flash drives, provide an advantage in that the access to the devices can be physically controlled, during data loading (when the media 190 is physically attached to a source computer); and also during data transport (physical carrying from one computer system to another). Nonetheless, unwanted, data-threatening files and unauthorized computer code (such as viruses) can still be inadvertently introduced onto such transfer media 190.

Manual data transfer: Another method (not illustrated) to securely transfer data between two computer systems entails manual data reading and data entry by clerical personnel. Two computer systems, 'A' and 'B', may be employed, where A and B are not connected by any conventional data transfer routes 170 (and where the use of data transfer media 190 is also excluded).

Instead, data from first computer system A can be printed onto hardcopy and read by clerical personnel; or the data can be displayed on a display of computer system A, and again read by clerical personnel. The clerical personnel can then manually enter the data into second computer system B, by displaying suitable data entry screens, and using a keyboard or other input means (such as a mouse) which is part of computer system B.

Manual data transfer may be much more secure than conventional data transfer via conventional connections 170, or via transfer media 190, but has at least three disadvantages: (1) It is expensive because it is labor intensive; (2) It is slow, due to the limits of human perceptions and typing speeds; and (3) It is prone to error due to human typing errors and fatigue.

Two computer systems may be considered mutually "data-isolated" or "proprietary" if they are not being connected by any conventional data transfer means 170, and no data is transferred between them via data transfer media 190. What is needed then is a system and method for high-speed, automated, highly reliable, and secure transfer of specifically selected data between two data-isolated computers, or between two data-isolated computer systems, so that: (i) the system and method reduces or renders impossible the security threats of conventional data transfer technologies 170, 190; and (ii) the system and method constrains data transfer to specifically designated data or documents only.

SUMMARY

Accordingly, in one aspect, the present system and method solves the problem by a method which entails display-based transfer of data in geometric form.

A first computer network has data stored on it, which may be text data, numeric data, or other forms of data, possibly stored in a structured form (such as tables or a spreadsheet). The present method operates on the data which is already stored on the first computer network so as to encode that data in a geometric data form. Such a geometric data form may be a bar code or matrix code representation, or geometric forms employing dots, hexagrams, or other geometric shapes, or other geometric, non-text, non-numeric data forms suitable for visual display and which can represent the source data of interest. Such geometric data forms generally can not be directly read or understood by most persons.

The method then displays the bar code or matrix code, or other geometric data form, on a display monitor connected to the first computer network. The method then causes the second computer network to receive the geometric representation of the source data.

The second computer network has a camera which obtains a view of the bar code, matrix code, or other geometric data representation. The second computer network then decodes the geometric data representation, such as the bar code or matrix code, to restore the data to its native form (such as text or numbers, plus the data structure if any). The second computer network can then store the retrieved data.

The method may first encrypt the data on the first computer network, before preparing the encrypted data for a geometric display format. In that case, the method ensures that the second computer system will first decode the geometric data representation, retrieving the encrypted data, and then the second computer system decrypts the data. The encryption key is provided by the first computer network, and the key may itself be encoded in a geometric data representation which may also be viewed and interpreted by the second computer system.

In another aspect, the present system and method solves the problem via computer software which enables display-based transfer of data in geometric form.

A first computer network has data stored on it, which may be text data, numeric data, or other forms of data, possibly stored in a structured form (such as tables or a spreadsheet). Software which is operative according to the present system and method, and which controls the first computer network, takes the data which is already stored on the first computer network and encodes the data in a geometric data form. The geometric data form may be a bar code or matrix code representation, or other geometric forms employing dots, hexagrams, or other geometric shapes, or other geometric, non-text, non-numeric data forms suitable for visual display and which can represent the source data of interest. Such geometric data forms generally can not be directly read or understood by most persons.

The software is then operative to cause the first computer network to display the bar code or matrix code, or other geometric data form, on a display monitor connected to the first computer network. The software is further operative on the second computer network, causing the second computer network to receive the geometric representation of the source data.

The second computer network has a camera which, under control of the software, obtains a view of the bar code, matrix code, or other geometric data representation. The second computer network then decodes the geometric data representation such as the bar code or matrix code, according to the instructions in the software, to restore the source data to its native form (such as text or numbers, plus the data structure if any). The second computer network can then store the retrieved data.

The software may first encrypt the data on the first computer network, before preparing the encrypted data for a geometric display format. In that case, the software controls the second computer system so as to ensure that the second computer system will first decode the geometric data representation, retrieving the encrypted source data, and then the second computer system decrypts that to ascertain the original source data. The encryption key is provided by the first computer network under the control of the software, and the key is itself encoded in a geometric data representation which may also be viewed and interpreted by the second computer system.

In another aspect, the present system and method solves the problem via a processor-based system, such as one or more computers, or one or more computer networks, which are configured for the display-based transfer of data in geometric form.

A first computer, computer system, or computer network has data stored on it, which may be text data, numeric data, or other forms of data, possibly stored in a structured form (such as tables or a spreadsheet). Via software, firmware, hardware, or a combination of the above, which is operative according to the present system and method, the first computer/system/network takes the data which is already stored on itself and encodes the data in a geometric data form. The geometric data form may be a bar code or matrix code representation, or other geometric forms employing dots, hexagrams, or other geometric shapes, or other geometric, non-text, non-numeric data forms suitable for visual display and which can represent the source data of interest. Such geometric data forms generally can not be directly read or understood by most persons.

The first computer, first computer system, or first computer network is then configured to display the bar code or matrix code, or other geometric data form, on a display monitor connected to the first computer, first computer system, or computer network.

A second computer, second computer network, or second computer system is typically not coupled with the first computer, first computer system, or first computer network via any conventional data coupling 170, such as wired 160 or wireless 170.1 networking, or via the internet cloud 170.3 or similar. The first and second systems/networks are essentially data-isolated from each other.

The second computer, second computer system, or second computer receives the geometric representation of the source data. To receive the geometric representation, the second computer, second computer system, or second computer network has a camera which is configured to obtain a view of the bar code, matrix code, or other geometric data representation displayed by the first computer, first computer system, or first computer network. The second computer/computer system/computer network is configured to decode the geometric data representation such as the bar code or matrix code, to restore the source data to its native form (such as text or numbers, plus the data structure if any). The second computer/computer system/computer network can then store the retrieved data.

The first computer/computer system/computer network may be configured to first encrypt the source data which it stores, before preparing the encrypted data for a geometric display format. In that case, the second computer/computer system/computer network is configured to first decode the geometric data representation, retrieving the encrypted source data; and then to decrypt that to ascertain the original source data. The encryption key is provided by the first computer network, and the key is itself encoded in a geometric data representation which may also be viewed and interpreted by the second computer system.

Exemplary embodiments of the present system and method, as discussed in detail below throughout this document, present an end-to-end solution to improve the security, efficiency, and accuracy of secure document data transfer, including for example and without limitation:

Source system information parsing;
Source system information encryption;
Barcode encoding;
Screen capture using 2D imaging scanners or cameras;
Secure optical data transmission
Barcode/Matrix Code decoding;
Information decryption;
Data extraction on the receiving system;
Adaptable architectures for security sensitive applications; and
Optical shielding of the geometric data display.

DETAILED DESCRIPTION

Figure 1:
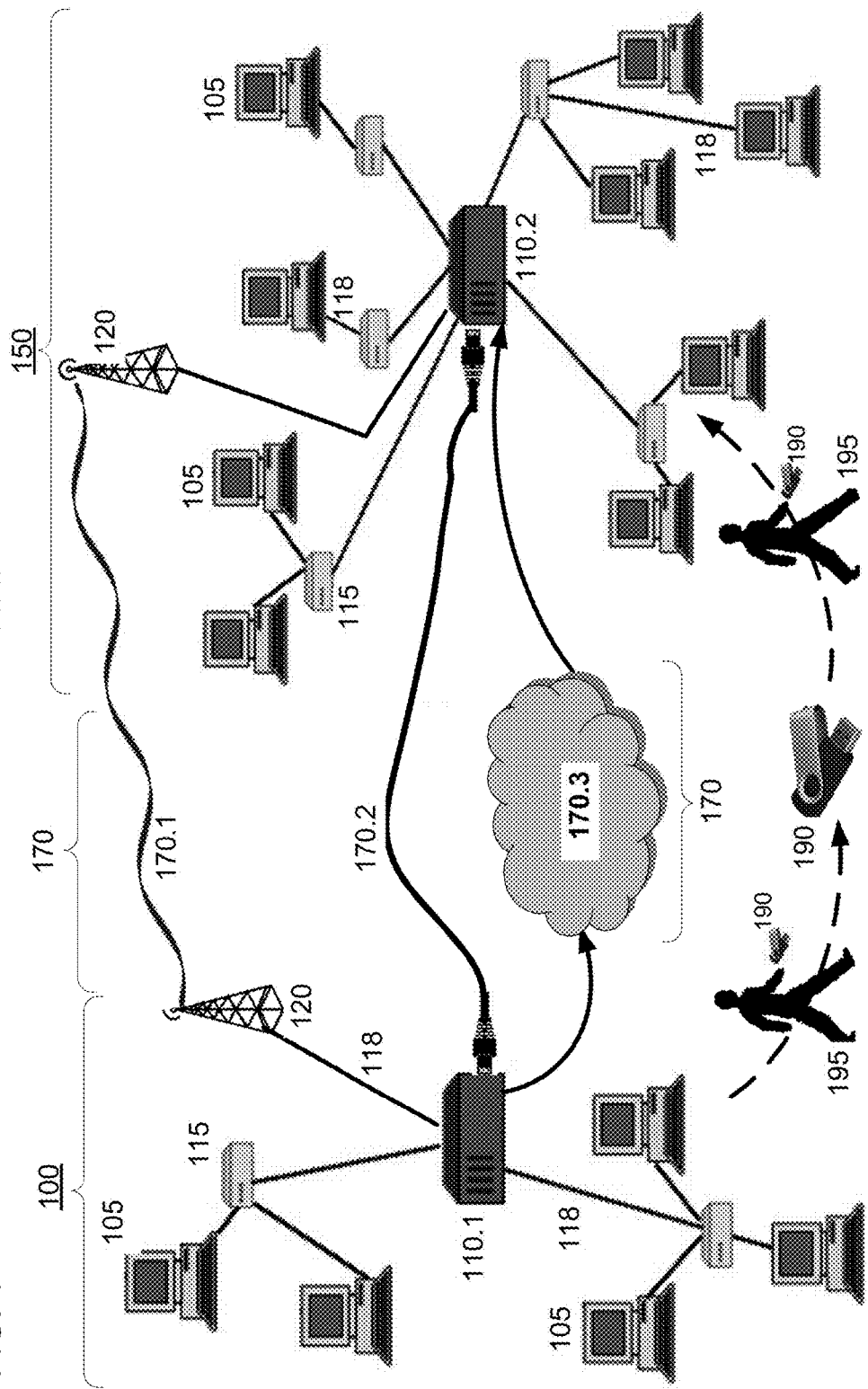
FIG. 1 is a schematic representation of two exemplary, conventional computer networks as they might be linked for conventional data transfer via exemplary, conventional data transfer methods.

In the following description, certain specific details are set forth in order to provide a thorough understanding of various embodiments. However, one skilled in the art will understand that the invention may be practiced without these details. In other instances, well-known structures associated with computers or computer networks, with data display, and/or with optical or video image transfer and capture, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Terminology

First (Transmitting) and Second (Receiving) Computers, Computer Systems, and Computer Networks: The present system and method entails communication of data, typically text or numeric data, possibly with related data structure, between two computers, two computer systems, or two computer networks. The system and method may be applied to data communication or data transfer between:

(i) two single computers;
(ii) two multi-computer systems (such as a first peer-to-peer network and a second peer-to-peer network);
(iii) two local area network (LANs) or wide area networks (WANs);
or between various combinations of the above, such as data communications between a single computer and a LAN, between a single computer and a WAN, between a peer-to-peer network and a WLAN, etc. In each case, a first computer or computer network acts as a data source, while a second computer or computer network functions as a data recipient.

In this document, it would be tedious and make for lengthier reading to constantly refer to a "first source computer, first source computer system, or first source computer network", etc. Therefore, for the sake of brevity, it will be understood that the terms "first computer," "first computer system", and "first computer network" may be used interchangeably, and generally will refer to any of the above as applicable. Similarly for such terms as "source computer," "source computer system", and "source computer networking"; and similarly for such terms as "recipient computer", "recipient computer system", and "recipient computer network." The latter may also be referred to, equivalently, as a "destination computer," "destination computer system", and "destination computer network."

Persons skilled in the art will further appreciate that in a source computer network, some or all of the source functions and operations described herein may in fact be all performed by a single computer on the network, or may be distributed among multiple computers on the network. (For example, a first computer of the source computer network may store the data to be transmitted, while a second computer of the source computer network prepares the data for geometric encoding and transmission.)

Similarly in a receiving computer network, some or all of the receiving functions and operations described herein may in fact be all performed by a single computer on the network, or may be distributed among multiple computers on the network. (For example, a first computer of the receiving computer network may obtain and decode the geometrically stored data, while a second computer of the destination computer network may provide final permanent storage for the received data.)

"Proprietary" or "Data-Isolated" Computer Networks: Due to security concerns, some computers or computer networks are configured or used in such a way that conventional data links are NOT permitted to attach into the computers or networks. The non-permitted conventional links typically include wired links such as Ethernet or USB, and also wireless/radio frequency (RF) connections. Such computers or computer networks are referred to herein, equivalently, as "proprietary" or "data-isolated." As discussed further below, transfer of data between such proprietary networks, has typically employed manual typing by clerical staff to transfer data, with the shortcomings of slow process and low accuracy due to manual mistakes.

Alphanumeric data: As understood herein, "alphanumeric data" includes digits and letters of an alphabet (such as the English alphabet, but also possibly alphabets of other languages); alphanumeric data may also include punctuation ("!", ".", ",", ";", ":", etc.) and other printed symbols which are routinely included as part of text documents, for examples, circular or square bullets, dollar signs ($), ampersands (&), asterisks (*), and other symbols commonly found on standard computer keyboards. In an embodiment, "alphanumeric data" may include or utilize any letters, digits, or other symbols which are represented in standard character-oriented computer codes such as ASCII, Unicode, or EBCDIC.

Data Transfer Between Computer Systems, Conventional

The present system and method embraces electronic devices capable of data transfer from a first data-isolated, secure, or proprietary computer (or computer network, etc.) to a second isolated, data-secure, or proprietary computer (or computer network, etc.). In particular, the present system and method embraces electronic devices capable of extracting data from a first computer system and transferring the data securely to a second computer system, with minimal or no risks to computer system security on either end.

By way of context and background, FIG. 1 is a system-level diagram of two exemplary computer networks, which may be regarded as a source network 100 and a receiving network 150, and which are configured for data transfer via a variety of exemplary, conventional data transfer modalities 170, 190 well known in the art. Persons skilled in the relevant arts will recognize that the designation of one network as "source" and the other as "receiving" is for convenience only, and that the roles can typically be interchanged or reversed.

Both computer networks 100, 150 may for example be local area networks (LANs) or wide area networks (WANs) which may include conventional computers 105, which may include desktop computers, workstations, laptop computers, tablet computers, servers, larger-scale supercomputers, and also smaller computational devices such as cell phones.

Such computers and computational devices typically include elements (not illustrated) such as microprocessors and digital signal processors; volatile memory (for example, random access memory (RAM)); non-volatile memory (read only memory (ROM), Flash memory, and disk drives); various controllers (video, keyboard, network interfaces, for example, Ethernet or Bluetooth devices); and one or more system buses to integrate these elements. Such computers may also include a variety of input and output devices for user interaction, such as a keyboard, a mouse, touchscreen displays, speakers, microphones, video cameras, biometric detectors, and other such elements. Together, these elements enable the computers and related computational devices to perform the manifold data manipulation tasks, data storage, data processing, and data communication tasks associated with contemporary computing.

For example, a microprocessor, operating under the control of program code stored in the computer's memory, may perform the tasks necessary to receive data from a user, store the data in a file on a disk drive, and transfer the data file over a network connection to another computer.

Computers 105 within a single network, such as source network 100 or receiving network 150, may be connected to each other via a variety of technologies, including hubs, bridges, and switches 115, referred to further herein simply as "switches 115" for brevity. Switches 115 may also connect computers 105 to a router 110. Computers 105, switches 115 and router 110 are connected via standard communications links 118 which may for example be wired connections (for example, Ethernet or USB links), wireless connections (for example, Bluetooth or Wifi), infrared links, or other kinds of local data links known in the art.

Router 110 is a device which provides a central point of connection between a first network 100 and a second network 150, each of which would respectively view the other as an "outside" network. Router 110 may also function as a general purpose file server, and may serve other functions as well. Router 110 is typically configured with a firewall (not illustrated), which is software and/or hardware designed to prevent the intrusion, into a network, of unwanted data, unwanted files, and generally to exclude unwanted external data connections.

In FIG. 1, router 110.1 provides access, and access control, to outside networks (such as receiving network 150) for all computers in source network 100; similarly, router 110.2 provides access and access control to outside networks (such as source network 100) for all computers in receiving network 150.

Conventionally, a variety of data transfer paths 170, 190 may be employed to transfer data from source network 100 to receiving network 150. Such data transfer paths 170 may include, for example and without limitation:

(a) Radio frequency (RF) and/or microwave wireless network connections 170.1 connecting routers 110, for example via WiFi (802.11 protocol) employing network antennas or access points 120, or via microwave or satellite transmission systems;

(b) Wired connections 170.2 connecting routers 110, which may employ such technologies as Ethernet links, the plain old telephone system (POTS) using ADSL or other technologies, and high density wired connections employing fiber optics rather than copper wires;

(c) Network-cloud communications 170.3 connecting routers 110, which may rely on a widely-used, generalized multipath connection, such as the Internet, to establish and maintain communications between networks 100, 150; and (d) Dedicated, portable hardware transfer media 190, such as flash drives 190, CDs or DVDs 190, or disk drives 190. With portable hardware transfer media 190, data is physically copied from a computer 105 in source network 100 onto the portable data transfer media 190; the portable data transfer media 190 is then physically transported to the receiving network 150 (transport being via hand-carrying, postal service, shipping via roads or air transport, etc.).

The data transfer media 190 is then typically physically coupled with a server or computer 105 in the receiving network 150; upon physical coupling, the data is transferred from data transfer device 190 onto the server or other computer 105 of receiving network 150.

(e) As noted above, and for purposes of this document, both optical-fiber connections (which employ laser light over fiber-optic cables) and infrared connections will be understood to be subsumed under conventional data transfer paths 170.

Disadvantages of Conventional Data Transfer: It is well-known that conventional network connections 170 between computers are subject to a variety of potential security threats, which may allow unauthorized users to have inappropriate access to stored data or even to modify the use and operations of a computer system. Threats to computer networks include direct wiretapping (intercepting the flow of data over wired or wireless connections), port scans, idle scans, denial of service attacks, DNS spoofing, man-in-the-middle attacks, phishing, the use of computer viruses to infect and control a computer system, and many others as well.

Most such attacks are dependent, directly or indirectly, on the existence of a direct connection between two computer systems or networks. Such connections are often of the forms of exemplary data transfer paths 170 discussed immediately above, and via data transfer media 190.

Most such conventional connections 170 (wireless 170.1, wired 170.2, cloud 170.3, fiber optics, and infrared connections) provide a generalized path for distribution of data or data packets with multiple types of content and from multiple sources. That is, any data which conforms to suitable protocols (for example, TCP/IP) can be carried over such data conventional transfer paths 170, and the data can potentially come from many different sources (for example, any computer with access to the conventional data transfer paths 170).

Various security measures, well known in the art, are employed to ensure computer security. These include password protection schemes, biometric user verification, "real person" authentication schemes (for example, CAPTCHA and other challenge-response tests used to distinguish human users from automated "users"), and other authentication schemes. Firewalls are used to control access to specific services and ports. Other security measures may be employed as well.

Nonetheless, conventional data transfer paths 170 are often essentially open data highways (at least at the physical level; for example, anyone with adequate hardware can monitor and broadcast over radio waves and generally over cloud media), which can potentially be accessed by multiple users, including malevolent users.

Data transfer media 190, such as disk drives, DVDs, and flash drives, provide an advantage in that that access to the devices can be physically controlled, both during data loading and data transport (physical carrying from one computer system to another). Nonetheless, unwanted, data-threatening files and computer, such as viruses, can still be inadvertently introduced onto such media.

Manual Data Transfer: As already discussed above, an alternative method (not illustrated in the figures) to securely transfer data between two data-isolated computer systems 100, 150 entails manual data reading and data entry by clerical personnel. Data from source computer system 100 is printed onto hardcopy or displayed on a display of the system 100. Clerical personnel then manually enter the data (typically by typing) into the receiving computer system 150. As also discussed above, manual data transfer may be much more secure than conventional data transfer via conventional wired or wireless connections 170 (or via transfer media 190); however, manual data transfer has the disadvantages of being labor intensive, expensive, very slow, and prone to human error in the data transfer.

Optical/Imaging-Based Data Extraction and Transfer

The present system and method reduces or renders impossible the security threats of conventional data transfer technologies 170, 190; and at the same time the present system and method constrains data transfer between two substantially data-isolated computers (or equivalently, proprietary computer systems) to the transfer of only very specifically designated data and documents.

Figure 2:
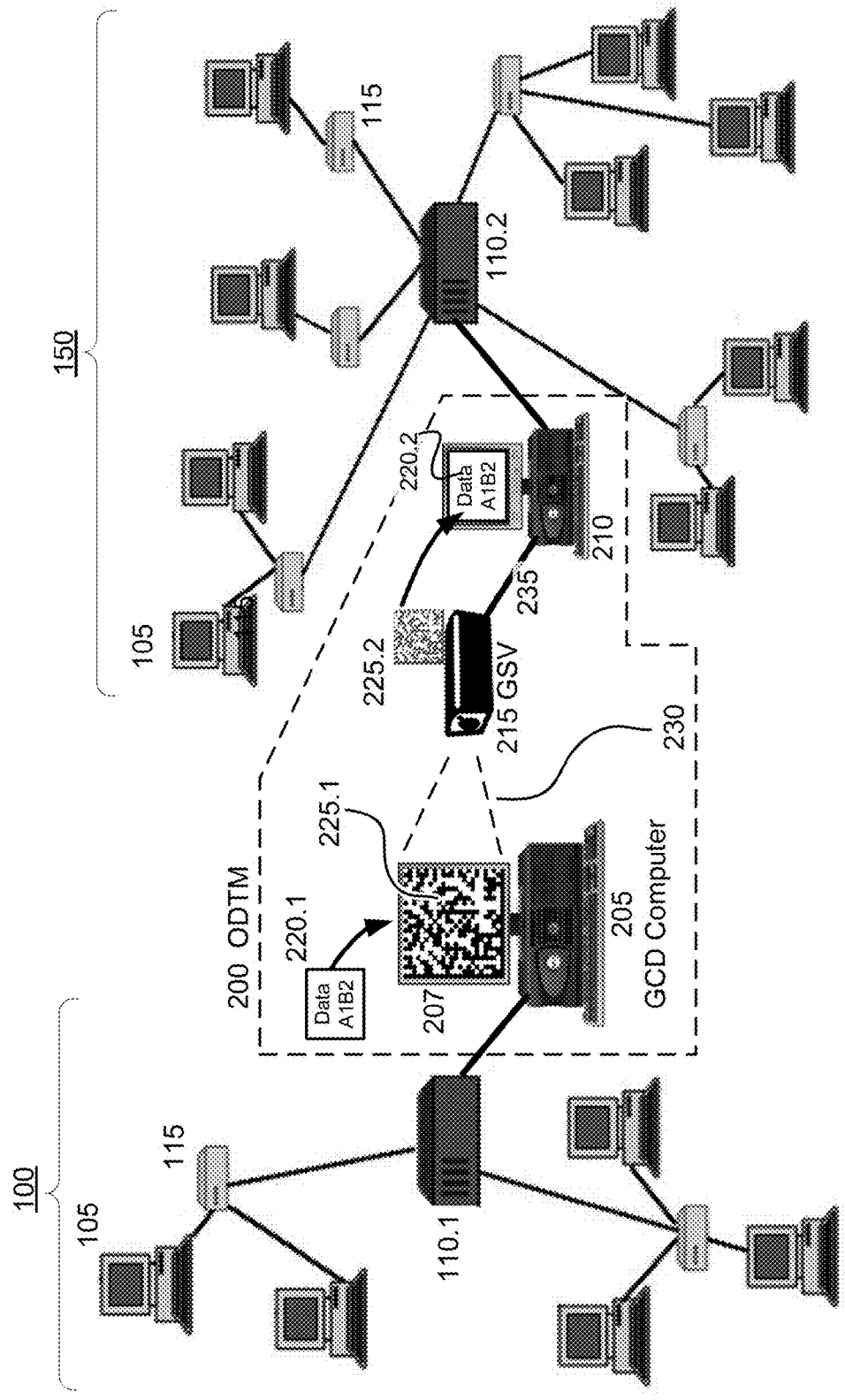
FIG. 2 is a schematic representation of two exemplary conventional computer networks as they might be configured for highly-secure optical data transfer according an exemplary embodiment of the present system and method.

FIG. 2 illustrates some exemplary elements of an exemplary data extraction and transfer system configured to operate in a highly-secure optical-transfer mode, according to the present imaging-based system and method. See concurrently also FIG. 3 (discussed further below), which illustrates many of the same exemplary elements as FIG. 2.

Some elements of FIG. 2 repeat elements of FIG. 1, and will not be described here again or will be described only in brief.

Bar Codes and Matrix Codes: Machine-readable symbols 225 provide a means for encoding data 220, such as text, numeric, and alphanumeric data, in a compact printable form (or embossed or displayable form) which can be scanned and then interpreted by an optical-based symbol detector.

Such machine readable symbols 225 are also referred to, equivalently, as geometric data representations 225, and are often attached to (or impressed upon) product packaging, food products, general consumer items, machine parts, equipment, and other manufactured items for purposes of machine-based identification and tracking. For purposes of the present system and method, however, geometric data representations 225 are used for display on a computer screen 207, to the further purpose of optical transfer of alphanumeric data 220.

One exemplary type of machine-readable symbol 225 is a bar code that employs a series of bars and white spaces vertically oriented along a single row. Groups of bars and spaces correspond to a codeword. The codeword is associated with an alpha-numeric symbol, one or more numeric digits, or other symbol functionality.

To facilitate encoding of greater amounts of information into a single machine-readable symbol, two-dimensional (2D) bar codes 225 have been devised. These are also commonly referred to as stacked, matrix and/or area bar codes, or as "matrix symbols" 225 or "matrix symbology barcodes 225". Examples of such two-dimensional symbologies include Data Matrix, Code One, PDF-417, Maxi-Code, QR Code, and Aztec Code. 2D matrix symbologies employ arrangements of regular polygon-shaped cells (also called elements or modules) where the center to center distance of adjacent elements is uniform. Typically, the polygon-shaped cells are squares. The specific arrangement of the cells in 2D matrix symbologies represents data characters and/or symbology functions.

As an example of a 2D matrix symbol technology, a Data Matrix code 225 is a two-dimensional matrix barcode consisting of high-contrast "cells" (typically black and white cells) or modules arranged in either a square or rectangular pattern. The information to be encoded can be text or numeric data 220, or control symbols 220. The usual data size ranges from a few bytes up to 1556 bytes. Specific, designated, standardized groups of cells—typically eight cells—are each referred to as a "symbol character." The symbol characters have values which are referred to as "codewords." With a black cell interpreted as a 0 (zero) and a white cell interpreted as a 1 (one), an eight-cell codeword can code for numbers 0 through 255; in turn, these numeric values can be associated with alphanumeric symbols through standard codes such as ASCII, EBCDIC, Unicode, or variations thereon, or other functionality.

The codewords—that is, the designated groups of cells in a symbol 225—have specific, standardized positions within the overall geometric data representation 225. The interpretation of a symbol 225 in a given context therefore depends on the codewords within the symbol; and in particular, the interpretation depends on both: (i) the contents of each codeword (that is, the pattern of cells in each codeword), and (ii) the placement or position of each codeword in the symbol.

Typically, for sequential alphanumeric data (for example, a product identification number or a street address), each sequential data character is assigned to the symbols of a codeword in a standardized order. For example, the order may be left-to-right along the rows of the symbol, or according to a standardized diagonal pattern of placement.

Bar code readers 215 or cameras 215 are employed to read the matrix symbols 225 using a variety of optical scanning electronics and methods. When machine-readable symbols 225 are not printed to paper, but are instead displayed on a standard computer display monitor, the displayed image may be substantially ideal for imaging purposes, with all of the cells of consistent, uniform size; each cell being fully filled with either total black or total white; and the contrast between black and white cells being substantially at 100%. "Smudging" and tearing of a symbol, or overwriting by other markings, which can occur with printed symbols, does not occur on a computer display 207. This makes for highly reliable, error-free reading by a geometric symbol viewer (that is a bar code scanner) 215.

In addition to encoding specific alphanumeric symbols, some codewords in a matrix symbol 225 may be employed for error correction. For example, machine-readable symbols based on the Data Matrix ECC 200 standard employ Reed-Solomon codes for error and erasure recovery. ECC 200 allows the routine reconstruction of the entire encoded data string when the symbol has sustained 30% damage (assuming the matrix can still be accurately located).

Symbol errors typically arise with the use of printed symbols, for example on package or product labels. The present system and method employs GCM 207 to display a matrix code, and GSV 215 in immediate proximity to GCM 207 to view the matrix code 225.1.

Due to the high reliability of video display technologies such as GSV 225, codeword errors in symbols 225 may be highly unlikely. In an embodiment, the present system and method may retain the use of error-correction symbols, for example due to their standardized use in symbol technologies; or due to the possibility (however low the likelihood) in symbol display by GCM 207 or in symbol reading by GSV 215. In an alternative embodiment, the present system and method may dispense with error-correction codewords in a symbol 225, in favor of higher-density data encoding.

Exemplary Optical Data Extraction and Transfer System: An exemplary optical data extraction system securely transfers data between proprietary source network 100 and proprietary receiving network 150, which are data-isolated from each by the deliberate omission and exclusion of conventional data transfer means 170, 190. Both networks again include one or more computers, computing devices and/or file servers 105, and may include switches 115 and/or routers 110.

Deliberately omitted are the conventional inter-network links 170 of FIG. 1, as well as data transfer media 190, again reflecting the mutual, enforced data isolation of networks 100, 150. Persons skills in the relevant arts will appreciate that either or both of source network 100 and receiving network 150 may well have conventional data connections 170, 190 to other, third-party networks (not illustrated) for example via servers 110.1, 110.2 and suitable links 170 (see FIG. 1). However, the two networks 100, 150 are mutually proprietary and data-isolated from each other as described above.

Optical Data Transfer Module: The system includes an optical data transfer module (ODTM) 200, which provides for secure transfer of data between source network 100 and receiving network 150.

In an embodiment, optical data transfer module 200 stores source data 220.1 which is to be transferred from source network 100 to receiving network 150. In an embodiment, the data storage may be transitory, for example on the order of one second or a fraction of a second. In an alternative embodiment, the data storage may be long-term, that is, storage in non-volatile memory.

In FIG. 2, exemplary data value "A1B2" is illustrated, which may represent a single data value or a succession of separate values "A1" followed by value "B2"); "A1B2" may also represent a data field label ("A1") followed by an associated value ("B1") for the data field. The value(s) "A1B2" illustrated is/are entirely exemplary and arbitrary, and is presented for convenience of illustration only. Any other computer-storable text, number or numbers, data field labels or headings and associated data values, or combinations thereof may be substituted, including for example and without limitation: multiple data fields or values, multiple pairings of data field labels with data values, multi-element data values (such as phone numbers, addresses, or dates), data tables, matrices, lists of data, data linkages, data pointers, or other data or data structures used to convey alpha-numeric data values.

In an embodiment, source data 220.1 may be initially stored, or be in long-term (non-volatile) storage, on any of computers 105 of source network 100, and may be transferred to geometric display code (GCD) computer 205 (discussed immediately below) only if/when needed for data transfer. In an embodiment, transfer data 220.1 may be deleted from GCD computer 205 immediately after optical data transfer is completed. In an alternative embodiment, transfer data 220.1 may be stored on geometric code display computer 205 for longer periods of storage or for permanent storage.

In an embodiment, GCD computer 205 is programmed or is programmable to convert transfer data 220.1 to a geometric data representation 225.1, employing suitable data conversion methods or algorithms. Details of this conversion are discussed further below. GCD computer 205 may also be programmed or programmable to provide encryption and other forms of data security for transfer data 220.1, as discussed further below.

The optical data transfer module 200 includes both an exemplary geometric code display (GCD) computer 205 and an exemplary geometric code display monitor (GCM) 207. The display monitor 207 is used to visually display the geometric data representation 225.1.

In an embodiment, GCD computer 205 is (as illustrated in FIG. 2) connected with router 110, but in alternative embodiments may instead be connected directly to any of the other computers 105 in source network 100; or connected to any of switches 115, and via switches 115 to other computers 105 in source network 100. In another alternative embodiment, GCD computer 205 may itself be an entirely stand-alone computer 105, in which case GCD computer 205 may support not only data transfer, but also permanent storage of the source data 220.1 to be transferred.

GCM 207 may be a conventional computer display, for example a flat screen monitor employing display technologies well-known in the art. However, GCM 207, in conjunction with GCD computer 205, may be specifically designated (for at least some specified periods of time) for the display of transfer data 225.1 which is encoded and possibly encrypted into a one-dimensional or two-dimensional geometric display image 225.1, such as a bar code or matrix code.

Figure 3:
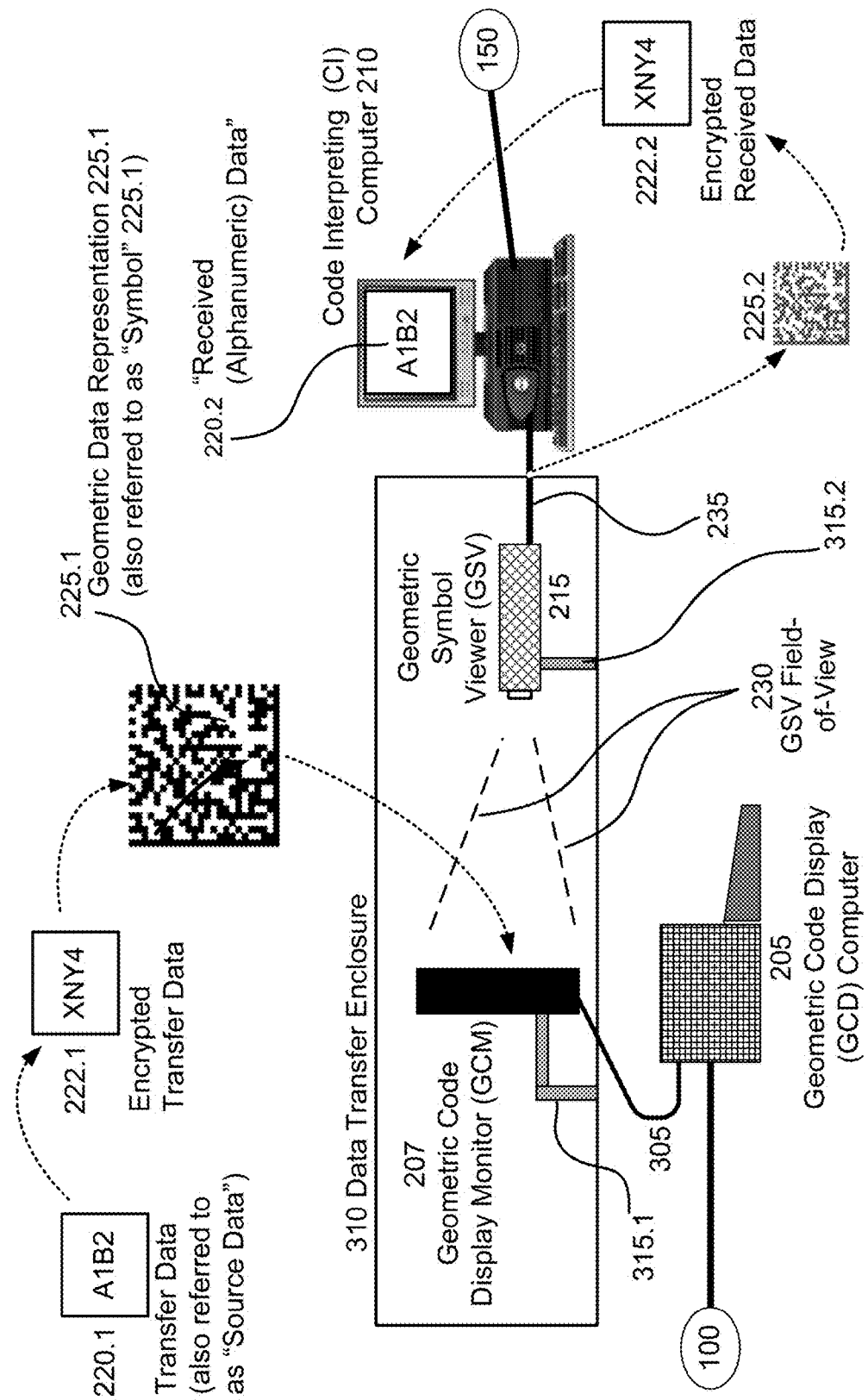
FIG. 3 is a detailed view of some elements of FIG. 2, particularly of an exemplary optical data transfer module (ODTM).

For convenience of illustration, GCD computer 205 and GCM 207 are shown in FIG. 2 as oriented facing out of the page, towards the reader of this document. In practical application (that is, real-world use), at least GCD display monitor 207 will be physically oriented so as to be substantially facing, or substantially directed towards, geometric symbol viewer (GSV) 215, which is described further below. FIG. 3 provides an expanded view of the ODTM 200, schematically illustrating an exemplary practical orientation of the geometric code monitor (GCM) 207 towards the geometric symbol viewer (GSV) 215, where the monitor 207 directly faces the geometric symbol viewer 215. (In FIG. 3, both display 207 and symbol viewer 215 are shown in profile.)

The optical field of view 230 of the symbol viewer 215 with respect to the monitor 207 is illustrated as well in both FIG. 2 and FIG. 3. (Is noted that elements 230 of FIGS. 2 and 3 do NOT represent any kind of wired/electrical linkage between GSV 215 and GCM 207 or GCD computer 205, and further do NOT represent any kind of wireless linkage between GSV 215 and GCM 207 or GCD computer 205.) Field of view 230 is sufficient to capture the display, on GCM 207, of geometric data representation 225.1.

Continuing further with reference to both FIGS. 2 and 3, the ODTM 200 includes a geometric symbol viewer (GSV) 215. The geometric symbol viewer 215 may be a conventional optical camera well known in the art, such as a standard multi-mega-pixel digital camera using digital image sensors such as CCD or CMOS technologies. The GSV 215 may also be a bar code reader or two-dimensional matrix-code reader (such as a CCD reader) well known in the art.

The GSV 215 may be configured to capture a series of still frames in rapid succession, or may be configured for continuous video capture from which successive still images may be extracted. GSV 215 has sufficient spatial resolution to capture, accurately and clearly, a bar code or matrix code 225.1 displayed on GCM 207. In an embodiment, and similar to optical scanners currently on the market, GSV 207 may be able to capture a bar code or matrix code, or other geometric code, in a time frame on the order of 10 milliseconds to 30 milliseconds ($10^{-2}$ seconds to $3*10^{-2}$ seconds). Other capture time frames, shorter or longer, may be envisioned as well.

GSV 215 may be linked to a code interpreter computer (CI computer) 210 via a suitable data link 235, such as a USB connection or a wireless connection (for example, Bluetooth), or even via other connections such as infrared.

Code interpreter computer (CI computer) 210 receives, from GSV 215, a captured (sensed) image 225.2 of the geometric data representation 225.1 displayed on GCM 207. CI computer 210 then employs suitable algorithms (discussed further below) to decode geometric data representation 225.2, converting the geometric data representation 225.2 back to an exact data copy 220.2 of the original source data 220.1. In content, then, source data 220.1 and data copy 220.2 are identical. (So for example, source data value "A1B1" from source computer network 100 is restored as "A1B1" for storage on receiving computer network 150.)

In an embodiment of the present system and method, once all the source data 220.1 is restored to received data 220.2, the received data 220.2 can used to reconstruct the original source document 505. In an alternative embodiment, receiving network 150 may employ the received data 220.2 to constructing a document of a different structure or format than the original source document 505, or for other application uses (such as calculations, etc.). Once data copy 220.2 is extracting on CI computer 210, the data value may be transferred to another computer(s) of receiving network 150.

In an embodiment of the present system and method, data source elements GCM 207 and GCD computer 205 may be physically separate units (monitor and computer) connected via a data cable 305 or other local data transfer means 305 (such as a wireless connection). In an alternative embodiment (not illustrated), GCM 207 and GCD computer 205 may be a structurally integrated unit, such as a tablet computer or laptop computer with an integrated display.

In an embodiment of the present system and method, data receiving elements GSV 215 and CI computer 210 may be physically separate structures (camera and computer) connected via a data cable 305 or other local data transfer means 325. In such an embodiment, GSV 215 may be a hand-held camera with suitable gripping means and/or suitable shape (not illustrated) for a person (also not illustrated) to hold GSV 215. In such an embodiment, and in system operation, the person would hold GSV 215 so that it is substantially placed and oriented to have an adequate field of view 230 of GCM 207. In an embodiment, the present system and method may employ hand-held scanners manufactured by Honeywell, Inc., such as the Xenon 1900g or 1902g scanners, the Voyager 1200g, 1202g, or 1400g scanners, or the Hyperion 1300g scanners.

In FIGS. 2 and 3 a geometric data representation 225 (or equivalently, "symbol 225"), as generated in GCD computer 205 and as displayed on GCM 207, is labeled as element "225.1". A symbol 225 as detected by GSV 215 and employed as a data element on CI computer 210 is labeled as "215.2." While a two-dimensional matrix code is illustrated in FIGS. 2 and 3, the terms "symbol 225" and "geometric data representation 225" may refer to bar codes, two-dimensional geometric codes, and possibly to other kinds of visually-displayable geometric data encoding as well.

Optical Data Security Measures and Features

Opaque Optical Enclosure: FIG. 3 illustrates an exemplary optical data transfer module (ODTM) 200.

Included in FIG. 3 is an exemplary data transfer enclosed 310 which may be employed in an embodiment of the present system and method. In order to maintain complete security of the geometric data representation 225.1 which is displayed by the GCM 207 and captured by the GSV 215, both the GCM 207 and GSV 215 may be jointly contained within an opaque data transfer enclosure 310. Enclosure 310 may create an optically sealed environment, which may effectively prevent any third-party viewer, either human or another optical capture device (that is, another camera) from viewing the geometric data representation 225.1 on GCM 207.

Enclosure 310 may be comprised of any practical opaque material, including metals, plastics, ceramics, composites, and numerous other opaque materials known in the art.

In an embodiment, data transfer enclosure 310 may be further employed to maintain a suitable, fixed relative position and orientation between GCM 207 and GSV 215. Suitable mechanical connections 315.1, 315.2 (collectively, 315) may be employed to attach or connect GCM 207 and GSV 215 to data transfer enclosure 310.

In an embodiment, either or both of geometric display computer 205 and/or code interpreting computer 210 may be internal to data transfer enclosure 310. In an alternative embodiment, either or both of geometric display computer 205 and/or code interpreting computer (CIC) 210 may be external to data transfer enclosure 310. In either embodiment, it will be necessary to connect system elements which are external to enclosure 310 (for example, any of GCD computer 205, CI computer 210, source network 100 and/ and receiving network 150) with elements which are internal to enclosure 310. Data transfer enclosure 310 may have suitable connectors or ports (not illustrated), such as USB ports, Ethernet ports, or possibly custom connectors, as well as additional electrical circuitry and wiring (or optical cabling). Such ports or connectors enable connections and communications of external devices to those elements 207, 215 which are internal to the enclosure 310. In all such embodiments, however, connections and connectors are configured so that source network 100 and receiving network 150 remain data-isolated from each other with respect to any wired or wireless communications 170, the only coupling being the optical coupling geometric data representations communicated optically between GCM 207 and GSV 215.

In embodiments discussed above, GCM 207 and GSV 215 may be openly visible elements (for example, if GSV 215 is to be a hand-held device to be manually aimed towards GCM 207). In alternative embodiments, at least GCM 207 is optically shielded from all but GSV 215.

Time-Limited Display: In an embodiment of the present system and method, an additional data security measure is to place a time-limit on the visibility of geometric data representation 225.1 on GCM 207. Such a time-limit ensures that a person or third-party camera obtaining a view of GCM 207 would have only a limited time to view geometric data representation 225.1, and to obtain such a view at only a specific time. Stated equivalently, in an embodiment, a data security measure of the present system and method may be to make the display of geometric data representation be non-persistent, or transitory.

In an embodiment, the specific time-limit on the display of geometric data representation 225.1 may be determined by the time required for GSV 215 to accurately capture an image from GCM 207. For an example, which is strictly exemplary and non-limiting, if GSV 215 can effectively capture an image in 20 milliseconds, then the display of geometric data representation 225.1 may be limited to $2*10^{-2}$ seconds, or to a marginally longer time (for example, $3*10^{-2}$ seconds or $5*10^{-2}$ seconds) to allow for some delay or lack of optimum time synchrony between image display and image capture.

Data Encryption: In an embodiment of the present system and method, and as a further security measure, data encryption may be employed to encrypt the transferred data 220.1 into encrypted transfer data 222.1. It is then the encrypted transfer data 222.1 which is encoded/stored in geometric data representation 225.1, with suitable decryption employed by code interpreting computer (CI computer) 210. Exemplary details of such encryption/decryption are discussed further below in this document.

Content-constrained/filtered data display: In an embodiment of the present system and method, it may be important for data security that the only data or graphics displayed on GCM 207 be symbols 225.1 and any associated operating data. ("Operating data" is discussed in conjunction with FIG. 4, below.)

With the present system and method, there may therefore be a concern that data from source network 100, which is data other than the intended document data, may also be displayed on GCM 207. Such data may be referred to, for convenience, as "private data from the source network", or simply in brief as "private data." The display of such private data from the source network would present a potential breach of source network data security, in that such data may be viewed by third parties or simply conveyed to receiving network 150 when not intended to be conveyed.

In an embodiment of the present system and method, GCD computer 205 and/or GCM 207 may be configured so that the associated application program (for optical data transfer) and/or GCM 207 display have exclusive control over, or exclusive access to, the full viewing display area of GCM 207. For example, suitable code may be employed so that the data display for the present system and method operates only in a full-screen display mode, and remains the exclusive foreground display or substantially exclusive foreground display on GCM 207.

In an alternative embodiment, software operative on GCD computer 205 may be operative to determine if any data appears on GCM 207 which is other than desired data or graphics, and so which may be private data. In various embodiments of the present system and method, a variety of measures may be employed responsive to detection, on screen, of private data. For example, an alert may be issued to a human system operator, or the application software may be configured to modify the visual display on GCM 207 so the potential private data is no longer visible. Other security measures may be employed as well.

In an alternative embodiment or complementary embodiment, data screening measures may be employed on the receiving end, for example by CI computer 210, to detect and filter-out any potentially private data which may be detected by geometric symbol viewer 215.

Document Parsing/Data Extraction for Transfer of a Full Document

Persons skilled in the art will appreciate that the complete transfer of data in a source document 505 may entail the transfer of numerous transfer data values 220.1 found within the document. As such, the present system and method may employ GCD computer 205 or other system computer resource to:

(i) parse a source document 505 to extract multiple source data values or transfer data values 220.1, and then (ii) create, for a single document, a succession or series of geometric data representations 225.1 to be displayed by GCM 207, each geometric data representation 225.1 representing one or multiple source data values 220.1 from the document.

The series of multiple data values from the source document 505 are captured in succession by GSV 215, in the form of multiple images captures 225.2 of the original series of geometric data representations 225.1. CI computer 210 receives the succession of captured images, restores them to multiple native data 220.2 (e.g., multiple text, numeric, or alphanumeric elements), and reassembles the multiple elements of received data 220.2 into a complete received document. In an alternative embodiment, CI computer 210 or other computers 105 of the receiving network put the received data 220.2 to other uses, such as filling in form fields on other documents on receiving network 150, filling in database fields or spreadsheets or similar documents on receiving network 150, or for other calculations.

Exemplary Method of Imaging-Based Data Extraction and Transfer

Figure 4:
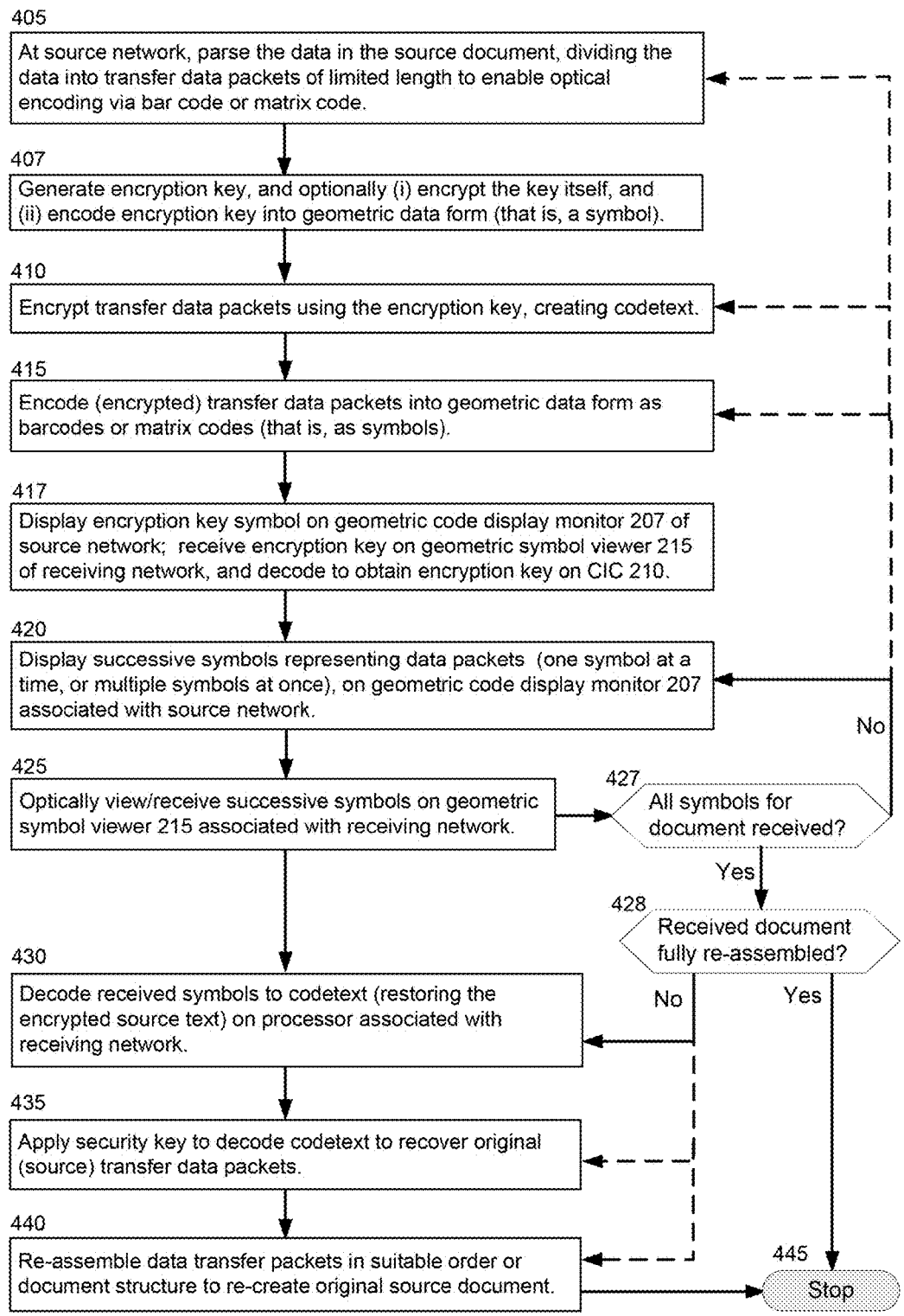
FIG. 4 is a flow-chart of an exemplary method for secure optical data transfer according to the present system and method.

FIG. 4 presents a flow-chart of an exemplary method 400 of secure extraction and transfer of document data via imaging/optical-based data extraction and transfer.

Persons skilled in the relevant arts will recognize that the method flow-chart, along with associated discussion herein, would provide a basis for a programmer to write computer code to implement the exemplary method. Such computer code would be operable on the hardware processor(s) of one or more computers of a source computer network 100 and receiving computer network 150 coupled via an exemplary optical data transfer module (ODTM) already described above in conjunction with FIGS. 2 and 3. Parts or all of such computer control code may be operable in GCD computer 205, CI computer 210, a processor of GSV 215, and possibly also on one or more other processors or computers of the source and receiving networks 100, 150.

Data parsing: Method 400 begins with step 405, data parsing or formatting. In an embodiment, parsing or formatting may be an automated process, performed for example, on geometric code display computer 205 of the optical data transfer module 200, or on some other computer 105 of source network 100. In an embodiment, parsing or formatting of a source document 505 may be partially guided by a human operator, employing a suitable view of the source document 505 and a suitable user-interface with GCD computer 205. In an alternative embodiment, parsing or formatting of a source document 505 may be partially or wholly guided by a parsing template (not illustrated) which was previously prepared by a human operator. Such a template may, for example, indicate field names of data fields in a source document 505, or may identify rows or columns where particular types of data may be found in a spreadsheet or table source document 505. In an alternative embodiment, parsing or formatting of a source document 505 may be wholly automated, employing for example a rule-based system to make suitable identifications of transfer data elements 220.1 in a source document 505.

Step 405 entails identifying units of source data 220.1, that is individual data elements 220.1 or groups of two or more data elements 220.1 from the source document 505, which are each suitable for encoding into an individual geometric data representation 225.1. In an embodiment, the source document 505 contains alphanumeric data which is to be transferred, and the individual data elements 220.1 to be parsed or identified are exclusively alphanumeric data.

In an alternative embodiment of the present system and method, a source document 505 may contain non-alphanumeric data, such as pictures or audio, which is not suitable for direct conversation to symbols 225. However, such non-alphanumeric documents may first be converted to a secondary source document 505 (also referred to as a "derived alphanumeric document") which encodes the pictures, audio, or other non-text data as alphanumeric data. The text representation in the secondary source document 505 may then be parsed into individual source data elements 220.1, for example as individual data elements of a designated common length, suitable for transfer by the present system and method.

Exemplary methods of data parsing: In varying embodiments, such parsing or formatting may take different forms or employ different methods.

In an embodiment, a structured document such as a table or a spreadsheet, may be parsed by identifying and extracting individual source data elements 220.1 from one particular row and/or one particular column at a time, for example by identifying key fields in a database table. (Key fields may be those with essential data for transfer, as opposed to non-essential data, or may be fields that link data in one table to another table. In some embodiments, all data in all data fields may be transferred.) Suitable identifying field names may be attached to the data, and/or included with the geometric data representation 225.1 to identify the transfer data 220.1 in terms of meaning and in terms of placement relative to other transfer data 220.1.

In an alternative embodiment, a form-field document, which employs labeled data fields to store text and/or numeric data, may be parsed by identifying and extracting source data 220.1 from individual data fields. Here again, particularly key fields may be identified, suitable identifying field names may be attached to the data, and included in the geometric data representation 225.1 to identify the source data 220.1 in terms of the data field with which it is associated.

In an alternative embodiment, a free-form text document, which employs exclusively or primarily a free-flow of prose (such as for example this present patent application document), may be parsed into limited-length strings or "packets" according to a maximum number of consecutive letters or numbers which are to be encoded into one geometric data representation 225.1. Such parsing may include attaching, to each unit or chunk of parsed text, a sequence number, indicating the order in which the packets appear in the original source document 505. In an alternative embodiment, the chunks or units of parsed text may be transmitted to the receiving network in the order they appeared in the source document 505, in which case a sequence number may be optional (for redundancy and error-checking), or may not be employed at all.

In an alternative embodiment, and for complex documents employing data structures, form-fields, and/or free-form text, a combination of the above methods may be employed. Other methods of data parsing and extraction may be employed as well, as may be suitable for still other formats or kinds of source document 505s.

The result in all cases is individual units or data packets of source/transfer data 220.1, which are extracted from the source document 505, which may each be referred to equivalently herein as a "transfer data element", "transfer data packet", "alphanumeric data element," or by variants on these terms, and which are suitable for encoding into a geometric data representation 225.1.

Encryption Key: In an embodiment of the present system and method, information encryption may be applied to source data 220.1 transferred from the proprietary source computer network 100 to the proprietary receiving computer network 150.

In one embodiment, then, in step 407 of method 400, GCD computer 205 or some other computer 105 of the source network 100 generates an encryption key (the key is not illustrated in the figures). In an embodiment, and to further enhance the transfer security, a one-time random security key can be used. In an embodiment a sample key may be randomly generated by geometric code display computer 205. In an alternative embodiment a random key may be generated by another computer, including possibly a computer which is itself isolated from source network 100, and it can be manually typed into code display computer 205 or scanned via a scanner (not illustrated).

To further enhance security, the key itself may be encrypted, for example via a secondary key known to GCD computer 205 and to CI computer 210.

Further in step 407, the present system and method further encodes the encryption key (or encodes the encryption key with secondary encryption) into a geometric data form (that is, a symbol [bar code or matrix code]) (not illustrated in the figures).

In an embodiment of the present system and method, an adaptive architecture could support different encryption algorithms, including for example and without limitation code-based encryption methods or cipher-based encryption methods known in the art, or custom-developed for the present system and method. In an embodiment, a human operator may select an encryption method among several possible options for any given document transfer activity; in an alternative embodiment, geometric code display computer 205 may randomly select an encryption algorithm.

The present system and method may also employ different encryption topologies, including for example and without limitation a symmetric security key or an asymmetric security key. To further enhance the security, the key itself can be encrypted using different methods before barcode encoding. In an embodiment of the present system and method, a second layer of encryption can be added employing same or a different encryption algorithm as the first algorithm. A timing limit can be applied to the encryption key(s) as well.

In some embodiments of the present system and method, in step 410 of method 400, the data to be transferred is encrypted using the encryption key generated in step 407. In an embodiment, encryption is applied to each data transfer packet 2201, resulting in a corresponding encrypted data transfer packet 222.1.

Barcode/Matrix Symbol Encoding:

Method 400 continues with step 415, the encoding of transfer data packets 220.1 (generated in step 405), or possibly encrypted data transfer packets 222.1 (as possibly encrypted in step 410) into a geometric representation 225.1, such as a bar code 225.1 or a matrix code representation 225.1. Because matrix codes 225.1 typically store more data than bar codes 225.1, some embodiments of the present system and method may rely upon matrix codes (also known as "matrix symbols"). In alternative embodiments, bar codes may be employed.

The geometric symbols 225.1 generated in step 415 are encoded by a hardware microprocessor and stored in memory, for example the hardware microprocessor and memory of GCD computer 205.

Machine-readable geometric data representations are also known as "symbols" 225. As used herein, then "symbols" 225 and "geometric data representations" 225 are equivalent terms.

Bar codes and matrix codes 225, or symbols 225, have already been discussed above in this document, but a few helpful points are emphasized again here for convenience:

While symbols 225 are often impressed upon product packaging, food products, general consumer items, and other manufactured items for purposes of machine-based identification, as used in the present system and method, the machine-readable geometric symbols 225 are employed for purposes of data transfer, as described throughout this document.

Symbols 225, such as bar codes and two-dimensional matrix codes 225, may represent or encode varying amounts of data, depending on their size (the number of cells) and various technical specifications. In some cases, symbols 225 may encode up to 2000 alphanumeric characters or more. In turn, and depending on the number of characters in a source document 505, a source document 505 may be encoded by a single symbol 225; or a source document 505 may require multiple symbols 225 to be encoded.

Within a symbol 225, specific, designated, standardized groups of cells—typically eight cells—are referred to as "codewords." With a black cell interpreted as a 0 (zero) and a white cell interpreted as a 1 (one), an eight-cell codeword can code for numbers 0 through 255; in turn, these numeric values can be associated with alphanumeric symbols through standard codes such as ASCII, EBCDIC, Unicode, or variations thereof.

Typically, for sequential alphanumeric data (for example, a product identification number, or a street address or similar), each sequential data character is assigned to the codewords of a symbol 225 in a standardized order. For example, the order may be left-to-right along the rows of the symbol 225, or according to a standardized diagonal pattern of placement.

As described above, bar code readers or cameras, referred to herein as geometric symbol viewers 215, are employed to read the matrix symbols using a variety of optical scanning electronics and methods.

In an embodiment of the present system and method, step 215 may employ a standard, publicly documented symbol technology (such as Data Matrix, Code One, PDF-417, MaxiCode, QR Code, Aztec Code or others) to encode source data 220.1 as symbols/geometric data representations 225.1. In an embodiment, the use of known symbol technologies enables the use, by GCD computer 205, of established, publicly documented algorithms or encoding techniques for encoding data 220.1 into symbols 225.

Proprietary symbol technologies and formats: In an alternative embodiment, the present system and method may employ one or more entirely non-public, non-standard, proprietary (that, is custom-designed) geometric symbol structures 225 for encoding alphanumeric characters. That is, the present system and method may employ one or more entirely proprietary geometric symbol structures 225 for encoding alphanumeric characters, further employing proprietary algorithms for encoding/decoding alphanumeric data to/from the proprietary symbol structures. Persons skilled in the relevant arts will realize that the design of such unique symbols 225 (with, for example, unique codewords) can be visualized and implemented in numerous possible ways; and further that the implementation of suitable text-to-custom-symbol conversion can be accomplished via a variety of possible algorithms.

In an embodiment, and in addition to or alternative to unique arrangements of cells, such custom geometric data representations 225 may employ, for example and without limitation, and alone or in various combinations:

(i) non-standard cell characters which may be employed to represent one or more data bits, including for example and without limitation: asterisks, forward- or back-slashes, diamond shapes, various musical notes and other elements of musical notation, emoticons (characters conventionally employed in e-mails, texting, and twitter communications to convey facial expressions), and other non-standard shapes, characters, and geographic forms;

(ii) various degrees of gray-scale shading;

(iii) the use of different colored cells or color(s) in other geometric shapes, forms, or elements;

(iv) geometric structures which incorporate curvature as a basis for data representation, possibly employing such factors as the length of a curve and degree of curvature;

(v) two-dimensional orientation of geometric sub-elements (that is, sub-element angles or relative angles); and (vi) fractal structures and other recursive or multiscale geometric data forms.

In embodiments, both the GCD computer 205, which generates the symbols 225.1, and the GSV 215 and/or CI computer 210 which capture and interpret the symbols 225.1, are elements of a common technology (ODTM 200), and so are typically offered and supported by a common vendor. A vendor of the present system and method can offer, at regular intervals in time (weekly, monthly, etc.) software or firmware updates which include modifications to the proprietary, custom geometric data symbols. This further enhances data security because if a third-party reverse-engineers the encoding/decoding of a specific method to generate custom geometric data symbols, the knowledge of how the symbol encodes/decodes data becomes rapidly obsolete over time as updated proprietary symbols are introduced and replace older versions.

Because the symbols/geometric data representations 225 are not being printed on labels or on objects, but instead are being displayed on a GCM 207, which may be a high resolution, high quality display monitor, greater variety in cell shape and color may be achieved while still also achieving extremely high accuracy and clarity in the display of symbols 225.

An advantage of using one or more proprietary symbols 225 is greater data security. Even if the symbols 225 are somehow observed by unwanted or unauthorized third-parties, such third-parties will typically lack the technical specifications to decode the symbols. The necessary symbol decoding technology will of course be embedded in proprietary decoding software, running for example on CI computer 210 (as discussed further below).

Transfer of Encryption Key: In step 417 of method 400, the present system and method may transfer the encryption key (generated in step 407) from source computer 100 to receiving computer 150. The transfer is accomplished by displaying the geometric data form of the key on GCM 207 so it may be detected/scanned by GSV 215/CI computer 210.

CI computer 201 then decodes the captured symbol to obtain the encryption key.

Display Bar Codes/Matrix Codes on Geometric Code Display Monitor: In step 420 of method 400, the geometric symbol(s) 225.1 generated in step 415 are displayed on geometric code display monitor 207.

In an embodiment of the present system and method, a single geometric symbols 225.1 is displayed at one time, with multiple geometric symbols 225.1 (if needed) typically being display successively in time to convey the full data contents of the source document 505. In an alternative embodiment, multiple geometric symbols 225.1 may be displayed simultaneously on the monitor 207 in order to convey more data on a single screen. Even in the latter embodiments, multiple successive screens of geometric symbols 225.1 may be displayed successively in time to convey the full data contents of the source document 505.

As discussed above, in an embodiment of the present system and method, a time-limit is imposed on the visibility of each successive screen-display of geometric data representation 225.1 on GCM 207. Such a time-limit ensures that a person or third-party camera obtaining a view of GCM 207 would have only a limited time to view geometric data representation 225.1, and to obtain such a view at only a specific time. Such a time limit may be on the order of a few milliseconds or several dozen milliseconds, or longer.

In an embodiment of the present system and method, a series of symbols 225.1 may be displayed on a continuing basis, possibly at regular time intervals (for example, ten times per second, or thirty times per second, or at other regular intervals).

In an alternative embodiment, GCM 207 may display a new symbol (or successive symbol in a series) upon a prompt by GSV 215. In an embodiment, GCM 207 may have a photo-detector configured to detect a laser-scanning light from GSV 215. GSM 207 may display a new geometric data representation 225.1 each time the laser-scanning light appears and then terminates (indicating a scan of the current image is completed). In an alternative embodiment, GSV 215 may have a dedicated display light for prompting, such as an LED (not illustrated in the figures), which flashes "on" when GSV is ready to receive a new image. In turn GCM 207 may have a photo-detector configured to detect the light from the LED, and report the detection to GCD computer 205. GCD computer 205 may then display the next symbol 225.1 on GCM 207 upon detection of the prompt.

Other methods of prompting may be envisioned as well between GSV 215 and GCM 207, while maintaining the data-security of the present system and method.

Persons skilled in the art will appreciate that in embodiments where GSV 215 is a hand-held scanner, GSV 215 may be manually operated by a person. In such embodiments, GCM 207 may be configured to display symbols 225 for longer periods of time (on the order of multiple seconds or longer), in order for a human operator to properly aim and trigger GSV 215 to scan symbols 225.

(Optional) display of operating data: In an embodiment of the present system and method, limited, selected operating data may be displayed on geometric code display monitor 207. Such operating data may include, for example and without limitation, a specific symbol or text indicating the conveyance of a new document; a new document identification number or label; a specific symbol or text indicating that conveyance of a full document is/was concluded with the current/previous symbol 225.1; and a sequence number which is to be associated with the current symbol 225.1 or group of symbols 225.1 (for example, "Symbol 1", "Symbol 2", "Symbol 3", Such operating data may be provided to support code interpreting computer 210 in analyzing the received symbols 225.2 and in reconstructing the original source document 505.

In an embodiment, such operating data may be displayed in time before or after the display of one or more symbols 225.1. In an alternative embodiment, such operating dating may be displayed on GCM 207 concurrent with the display of a symbol or symbols 225.1. For example, sequence numbers may be displayed on GCM 207 at the same time as the associated symbols 225.2.

View/Receive Bar Codes/Matrix Codes on Geometric Symbol Viewer: In step 425 of method 400, the geometric symbols 225.1 displayed on GCM 207 are detected by geometric symbol viewer (GSV) 215. In an embodiment, GSV 215 may detect an initial display, for a new document to be transferred, of a geometric data representation 225.1 by GCM 207. That new document conveyance is being initiated may be indicated, for example, by the display of a specified form of "Start" operating data or code on GCM 207.

Symbol Display/Capture Synchrony and Reliability: Step 425, symbol capture by GSV 215, is substantially synchronous, overlapping, or simultaneous in time with step 420, symbol display on GCM 207. As already discussed above, in various embodiments of the present system and method, a variety of approaches may be used to ensure that symbol capture by GSV 215 is concurrent in time with symbol display by GCM 207.

In an embodiment, once symbol display has been initiated, both GCM 207 and GSV 215 (along with associated computers GCD computer 205 and CI computer 210) may be programmed to continue with symbol display/capture at specified intervals or a specified rate, for example, ten symbols per second or twenty symbols per second.

Various means and method steps may be employed to ensure as well that all symbol images 225.1 displayed by GCM 207 are captured by GSV 215. For example, and as already noted above, one or more signaling LEDs (not shown in the figures) may be used to optically signal between GCM 207 and GSV 215, either employing different LED colors for different signals, or different LED on/off patterns and timings to convey different signals. In an embodiment, both GCM 207 and GSV 215 may employ LEDs and LED light detectors (again, not illustrated in the figures). In an alternative embodiment, GCM 207 may employ the display of various operating data (as discussed above) to signal operating status to GSV 215, while GSV 215 may employ LEDs or other non-wired, non-RF means to convey operating data to GCM 207.

In an alternative embodiment, both display of a single symbol 225.1 or multiple symbols 225.1 on GCM 207, and capture of the display symbol or symbols 225.1 by CI computer 210, may be manually initiated by a human operator. For example, keystrokes or suitable touchscreen taps may be employed to initiate symbol display via GCM 207 and GCD computer 205, and similarly to initiate symbol capture via GSV 215 and CI computer 210. Such manual control may be particularly applicable in contexts where short documents are expected to be transferred from source computer network 100 to receiving computer network 150. Such short documents may in some cases be encoded via the display of a single symbol/geometric data representation 225.1; or via the display of multiple symbols 225.1, but where the multiple symbols 225.1 can all be fit into one, single display image on GCM 207. In such real-world usages, where only one (or just a few) screen images of symbols 225.1 can transfer an entire source document 505, manual control of symbol display/capture may be practical and convenient.

Geometric symbol viewer 215, possibly in conjunction with CI computer 210, captures the symbol/geometric data representation 225.1 in the form of an internal digital representation 225.2. Persons skilled in the relevant arts will recognize that a variety of internal digital representations may be employed by the processor(s) and memory(s) of GSV 215 and CI computer 210.

In step 430 of method 400, the geometric symbol(s) 225.2 captured by geometric symbol viewer (GSV) 215 is/are decoded back into an alphanumeric form. In an embodiment, decoding is performed by GSV 215. In an alternative embodiment, symbols 225.2 are transferred to CI computer 210 and are decoded by CI computer 210.

Symbols 225.2 are decoded by suitable decoding algorithms which are appropriate for the encoding algorithm(s) employed in step 415 above.

In embodiments of the present system and method, if in step 415 the source data 220.1 (or encrypted source data) was encoded into geometric form according to standardized two-dimensional matrix symbologies (such as Data Matrix, Code One, PDF-417, MaxiCode, QR Code, and Aztec Code), then the corresponding decoding algorithms will be employed in step 430.

In alternative embodiments, if in step 415 the source data 220.1 (or the encrypted source data 222.1) was encoded into geometric form according to a proprietary two-dimensional symbol encoding, then a corresponding proprietary decoding algorithms will be employed in step 430.

Direct Decoding to Received Data: In embodiments where steps 407, 410 and 417 of the exemplary method are not employed, then original transfer data 220.1 is not encrypted. During step 430, then received geometric symbols 225.2 are directly decoded into received alphanumeric data 220.2. Each element of transfer data 220.1 from the source document 505 will have a corresponding element of received data 220.2 which can be used to recreate the source document 505 on destination network 150.

Decoding to Encrypted Received Data: In embodiments where steps 407, 410 and 417 of the method are employed, original transfer data 220.1 is encrypted to encrypted transfer data 222.1. During step 430, then received geometric symbols 225.2 are decoded into received encrypted data 222.2, also referred to generally as "codetext" 525 (see FIG. 5 below) (that is, encoded text). Each element of transfer data 220.1, or possibly multiple elements of transfer data 220.1, from the source document 505 will have a corresponding element of received encrypted data 222.2.

Decode Codetext: In embodiments where, in step 410 (above) the original transfer data packets 220.1 were encrypted into encrypted transfer data 222.1, then in step 435 of method 400, the received encrypted data packets 222.1 are decrypted into received alphanumeric data 220.2. The decryption is performed by applying the security key generated in source computer network 100. Here again, each element of transfer data 220.1 from the source document 505 will have a corresponding received data 220.2. Received data 220.2, which can then be used to recreate the source document 505 on destination network 150.

Recreation of original source document 505 as received document, or other applications of received data: In step 440, and as already discussed above, in an embodiment of the present system and method, once all the source data 220.1 is restored to received data 220.2, the received data 220.2 is used to reconstruct the original source document 505. In an alternative embodiment, in step 440 CI computer 210 or some other computer 105 on receiving network 150 may employ the received data 220.2 to construct or fill in a document of a different structure or format than the original source document 505 (such as a form document, spreadsheet, table, etc.), or for other application uses (such as calculations, etc.)

Parallel steps and processing: Persons skilled in the relevant arts will appreciate that at least some steps of exemplary method 400 may be performed in parallel. For example, once a first symbol or group of symbols 225.1 have been optically transferred from source network 100 to receiving network 150 (steps 420 and 425), receiving network 150 may begin decoding the received symbols (steps 430 and 435) and even begin to re-assemble a received document (step 440). At the same time, source network 150 may continue the optical transfer of additional symbols 225.1 to receiving network 150 (so continuing steps 420 and 425). Other steps may potentially occur in parallel as well.

Persons skilled in the relevant arts will also appreciate that symbol display (step 420) and symbol receiving (425) will continue until all source data (220.1) or encrypted source data (222.1) have been transferred. In step 427 of method 400, the present system and method determines if all transfer data packets (220.1) have been transferred. For example, operating data (discussed above) may indicate when data transfer is complete. As illustrated in the flowchart of FIG. 4, several possible outcome paths are possible based upon the determination.

Similarly, CI computer 215 will continue to reassemble a copy of the source document 505, or will continue to generate a document based on the source data (220.1), until document assembly is complete. Step 428 of method 400, indicates several possible decision paths and outcomes.

Exemplary Source Document 505 and Symbols

Figure 5:
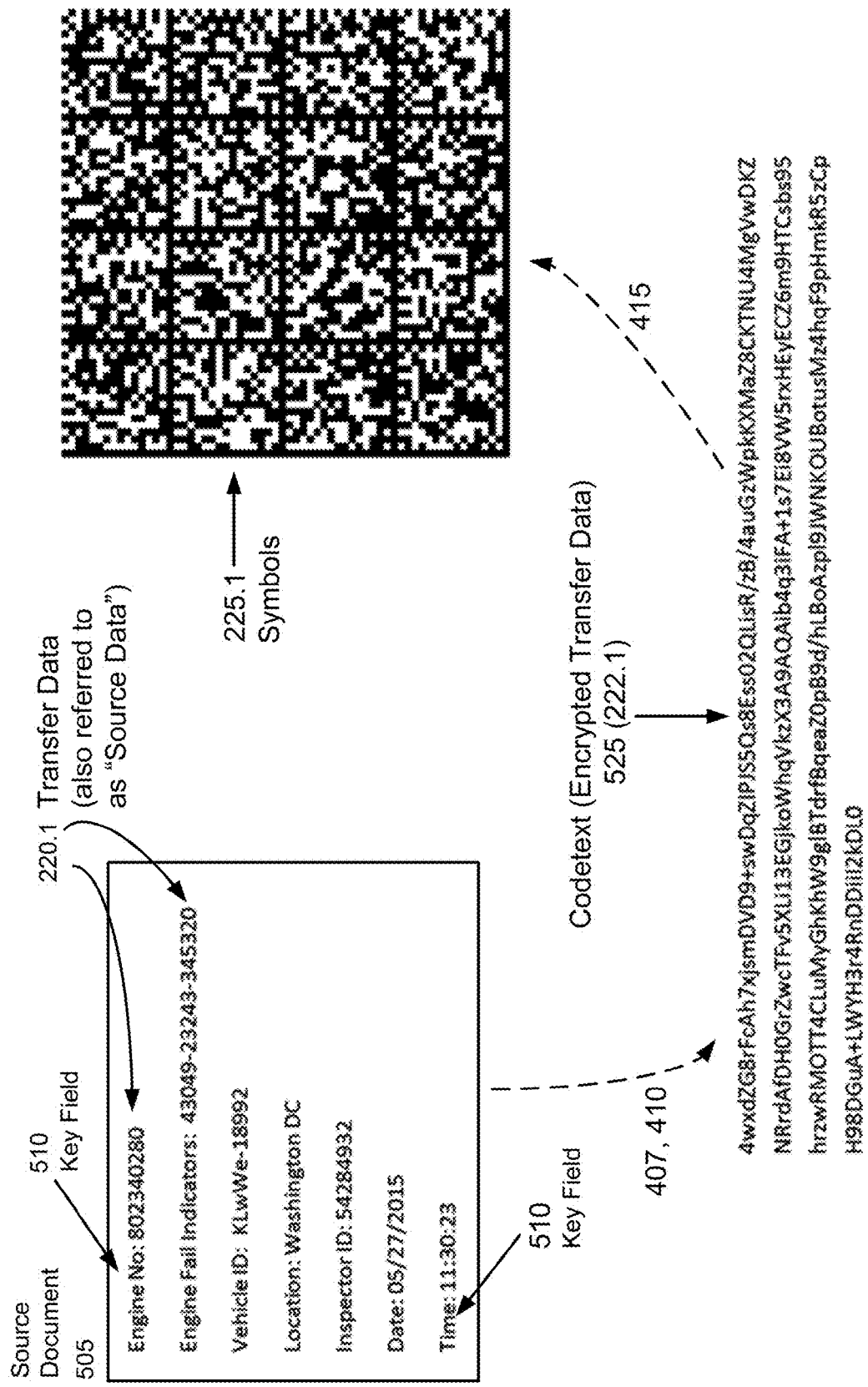
FIG. 5 illustrates an exemplary source document 505 for data transfer, an exemplary codetext based on data from the source document 505, and an exemplary two-dimensional geometric data representation of the codetext.

FIG. 5 illustrates an exemplary source document 505 (in this case, an engine maintenance record), which includes key fields 510 to identify the elements of the source data, and transfer data 220.1 suitable for extracting (step 405 of method 400, discussed above). In an embodiment, either or both of source network 100 and receiving network 150 may acquire requisite defining information for the key fields based on a previously prepared document template (not illustrated in FIG. 5).

FIG. 5 further illustrates that the application of a suitable encryption key (not shown in the figure), as per steps 407 and 410 of method 400, results in the generation of codetext 525 which represents the transfer data 220.1 in encrypted form (generally, encrypted transfer data 222.1, described above). The code text 525 (222.1) may include both the key fields 510 and the associated, particular transfer data 220.1 of the source document 505.

FIG. 5 further illustrates that the application of a suitable symbol encoding method, as per step 415 of method 400, results in the generation of one or more symbols 225.1 or matrix codes 225.1. The symbols represent the transfer data (220.1) if data encryption is not applied, or represent the encrypted transfer data 222.1 (codetext, 525) if encryption is applied. The symbol(s) 225.1 are suitable for display on GCM 207 and detection by GSV 215 (steps 420 and 425 of method 400), and then for further decrypting/decoding the CI computer 210 (steps 430, 435, 440 of method 400).

Persons skilled in the relevant arts will appreciate that the source document 505, codetext 525, and symbols 225.1 shown in FIG. 5 are exemplary only, and should in no way be construed as limiting.

Hardware and Software Prototype

Figure 6:
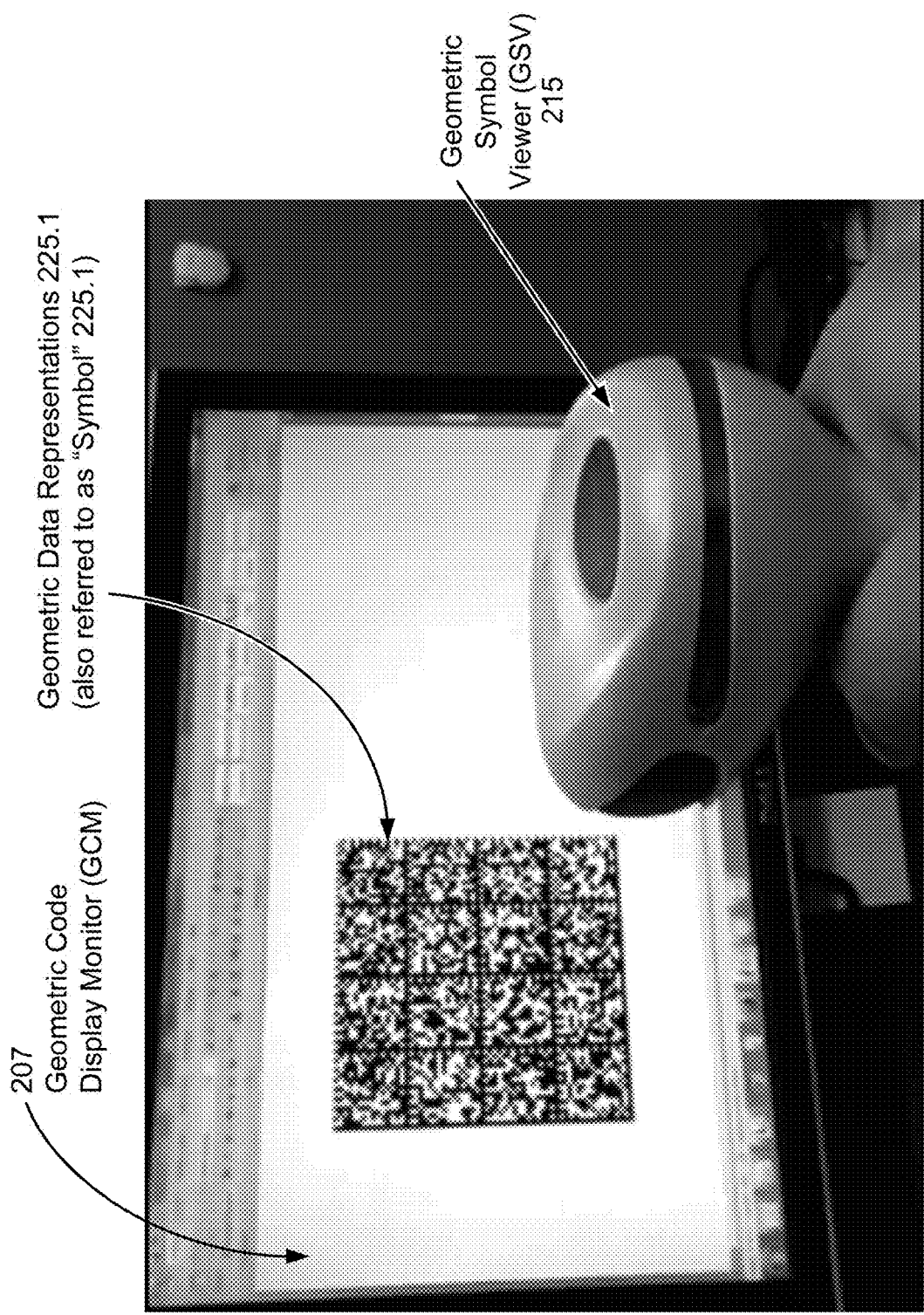
FIG. 6 illustrates an exemplary display of a two-dimensional geographic symbol, displayed on a monitor and being scanned by a geometric symbol viewer.

FIG. 6 is a photograph of some elements of a prototype demonstration of the present system and method. The prototype includes a GCM 207 which display a plurality of geometric representations 225.1 of source data 220.1 (source data not shown in the figure), and/or geometric representations 225.1 of encrypted source data 222.1 (encrypted source data not shown in the figure). Also shown in the photograph is a hand-held GSV 215 configured for symbol capture, and held so as to be suitably oriented for capture of the symbols 225.1 on the display 207.

Persons skilled in the relevant arts will appreciate that the photograph includes some elements which may not be present in actual applications of the present system and method. For example, various menus, icons, data fields and tab elements displayed at both top and bottom of GCM 207 are present in the prototype version actually shown, but may not be present in (and may be specifically excluded from) commercial applications on the present system and method. For example, such elements may be excluded to prevent stray or unwanted data from being transferred from source network 100 to receiving network 150. Numerous other elements of the present system and method, described in various embodiments above, are not shown in the photograph of FIG. 6.

Further Embodiments (A)

In further embodiments, labeled A1 through A10, the present system and method may also be characterized as:

A1. A method for secure transmission of document data between a source computer and a receiving computer, comprising:

parsing, via a hardware processor of the source computer, an alphanumeric content of a source document into a plurality of source alphanumeric data elements;

encrypting, via the hardware processor of the source computer, each source alphanumeric data element of the plurality into an encrypted source data element;

encoding, via the hardware processor of the source computer, each encrypted source data element into a source geometric data representation, yielding a plurality of source geometric data representations;

displaying on a display screen of the source computer, for a specified, limited period of display time, each source geometric data representation of the plurality;

capturing via an imaging device of the receiving computer the plurality of source geometric data representations which are displayed on the display screen of the source computer, wherein the imaging device is configured to synchronize the capture of each source geometric data representations with the specified, limited period of display time for each respective source geometric data representation;

decoding, via a hardware processor of the receiving computer, the plurality of source geometric data representations to obtain a respective plurality of received copies of the encrypted source data elements;

unencrypting via the hardware processor of the receiving computer the plurality of encrypted source data elements to recover the plurality of source alphanumeric data elements; and combining on the receiving computer the plurality of alphanumeric data elements to form a received document based on the data transferred from the source document.

A2. The method of embodiment A1, further comprising:

encoding into a source geometric data representation of the plurality an indication of a placement of the associated source alphanumeric element within the source document.

A3. The method of embodiment A2, wherein encoding the placement comprises at least one of encoding, into the source geometric data representation, at least one of:

a data field identifier of the associated source alphanumeric element;

an identification of at least one of a table column, a table field name, or a table row of the associated source alphanumeric element;

an identification of at least one of a spreadsheet column, a spreadsheet field name, or a spreadsheet row of the associated source alphanumeric element;

an identification of a relative placement of the associated source alphanumeric element in relation to a second, different source alphanumeric element of the source alphanumeric document;

an identification of a two-dimensional spatial placement of the associated source alphanumeric element on a designated page of the source document; and an ordinal number of the associated source alphanumeric element in the source document, said ordinal number indicating an ordering of the source alphanumeric element in relation to one or more other source alphanumeric elements.

A4. The method of embodiment A1, further comprising:

displaying the plurality of source geometric data representations within an optically sealed environment, wherein each source geometric data representation of the plurality is viewable by the imaging device of the receiving computer but is shielded from viewing by any third party viewer.

A5. The method of embodiment A1, wherein:

encrypting, on the source computer, each source alphanumeric data element into an encrypted source data element comprises applying to each source alphanumeric data element a proprietary encryption method; and decrypting, on the receiving computer, each encrypted source data element back to the corresponding source alphanumeric data element comprises applying a proprietary decryption method associated with the proprietary encryption method.

A6. The method of embodiment A1, wherein encrypting each source alphanumeric data element into an encrypted source data element comprises:

randomly selecting, on the source computer, a selected encryption method from among a plurality of stored encryption methods;

conveying the random choice of encryption method to the receiving computer via an optical communication; and decrypting, on the receiving computer, the encrypted source data elements using a decryption method associated with the randomly selected encryption method.

A7. The method of embodiment A1, wherein encoding an encrypted source data element of the plurality into a source geometric data representation further comprises:

encoding via a proprietary geometric encoding method to encode the encrypted source data element into a proprietary geometric data representation; and decoding via a corresponding proprietary geometric decoding method to recover the encrypted source data element.

A8. The method of embodiment A1, further comprising:

applying a content filtering to the display screen, wherein the display screen is configured to:

display at least one of:

the plurality of source geometric data representations, and an operating data pertaining to the display of the plurality of source geometric data representations; and not display from the source computer display any other data, executable code, or other non-designed files which are stored on the source computer.

A9. The method of embodiment A1, further comprising:

encoding an encryption key employed in an encryption process on the source computer into an encryption key geometric data form, wherein said encryption key comprises at least one of:

a first encryption key for encrypting each source alphanumeric data element of the plurality into the encrypted source data element; and a second encryption key for encrypting the first encryption key prior to a communication of said first encryption key from the source computer to the receiving computer;

displaying said encryption key geometric data form on the display screen of the source computer;

capturing said encryption key geometric data form on the imaging device of the receiving computer; and decoding said encryption key geometric data form on the receiving computer to obtain the encryption key.

A10. The method of embodiment A1, further comprising:

converting a non-alphanumeric document of the source computer to an alphanumeric data representation to be stored in a derived alphanumeric document on the source computer; and employing the derived alphanumeric document as the source document, wherein the non-alphanumeric document is securely transferred to the receiving computer.

Further Embodiments (B)

In further embodiments, labeled B11 through B19, the present system and method may also be characterized as:

B11. A method for secure transmission of document data between a source computer and a receiving computer, comprising:

parsing, via a hardware processor of the source computer, an alphanumeric content of a source document stored on the source computer to extract a source alphanumeric data element;

encoding, via the hardware processor of the source computer, the source alphanumeric data element into a source geometric data representation;

displaying on a display screen of the source computer, for a designated limited period of display time, the source geometric data representation;

capturing via an imaging device of the receiving computer, during the designated limited period of display time, the source geometric data representation which is displayed on the display screen of the source computer; and decoding, via a hardware processor of the receiving computer, the source geometric data representation to obtain a received copy of the source alphanumeric data element.

B12. The method of embodiment B11, further comprising parsing the alphanumeric content of the source document into a plurality of source alphanumeric data elements which, upon optical transfer to the receiving computer, are sufficient to reconstruct the original source document.

B13. The method of embodiment B12, further comprising:

encoding into a source geometric data representation of the plurality an indication of a placement of the associated source alphanumeric element within the source document.

B14. The method of embodiment B11, further comprising:

encrypting, via the hardware processor of the source computer, the source alphanumeric data element into an encrypted source data element, wherein the source geometric data representation comprises the encrypted source data element; and decoding, via a hardware processor of the receiving computer, the source geometric data representation to obtain a received copy of the encrypted source data element;

unencrypting, via the hardware processor of the receiving computer, the received copy of the encrypted source data element to recover the source alphanumeric data element.

B15. The method of embodiment B14, wherein:

encrypting the source alphanumeric data element into the encrypted source data element comprises applying to the source alphanumeric data element a proprietary encryption method; and decrypting the encrypted source data element back to the corresponding source alphanumeric data element comprises applying a proprietary decryption method associated with the proprietary encryption method.

B16. The method of embodiment B14, wherein encrypting the source alphanumeric data element into an encrypted source data element comprises:

randomly selecting, on the source computer, a selected encryption method from among a plurality of stored encryption methods;

conveying the random choice of encryption method to the receiving computer via an optical communication; and decrypting, on the receiving computer, the encrypted source data element using a decryption method associated with the randomly selected encryption method.

B17. The method of embodiment B14, further comprising:

encoding an encryption key employed in the encryption process on the source computer into an encryption key geometric data form;

displaying said encryption key geometric data form on the display screen of the source computer;

capturing said encryption key geometric data form on the imaging device of the receiving computer; and decoding said encryption key geometric data form on the receiving computer to obtain the encryption key.

B18. The method of embodiment B11, wherein encoding the source alphanumeric data element into the source geometric data representation further comprises:

encoding on the source computer via a proprietary geometric encoding method to encode the source alphanumeric data element into a proprietary geometric data representation; and decoding on the receiving computer via a corresponding proprietary geometric decoding method to recover the source alphanumeric data element.

B19. The method of embodiment B11, further comprising:

displaying the source geometric data representation within an optically sealed environment, wherein the source geometric data representation is viewable by the imaging device but is shielded from viewing by any third party viewer.

Further Embodiment (C)

In a further embodiment, labeled C20, the present system and method may also be characterized as:

C20. A method for securely transmitting a specified source document data between a source computer and a receiving computer while securely limiting data communication between the source computer and the receiving computer to only the specified document data, comprising:

configuring the source computer and the receiving computer for mutual data isolation, wherein both the source computer and the receiving computer are configured to exclude linkage and exclude mutual data communication via any general communications paths, said excluded general communications paths comprising at least and all of:

a wired connection, an optical cable connection, a radio frequency (RF) connection, an infrared connection, a cloud connection, and a portable data transfer media;

parsing, via a hardware processor of the source computer, an alphanumeric content of the specified source document into a plurality of source alphanumeric data elements;

encoding, via the hardware processor of the source computer, each source alphanumeric data element of the plurality into a source geometric data representation;

displaying on a display screen of the source computer, each source geometric data representation of the plurality;

capturing via an imaging device of the receiving computer the plurality of source geometric data representations which are displayed on the display screen of the source computer;

decoding, via a hardware processor of the receiving computer, the plurality of source geometric data representations to obtain a respective plurality of received copies of the source alphanumeric data elements; and combining on the receiving computer the plurality of received alphanumeric data elements to form a received document based on the data transferred from the source document.

To supplement the present disclosure, this application incorporates entirely by reference the following commonly assigned patents, patent application publications, and patent applications:

U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,818; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,599,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,596,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; U.S. Pat. No. 8,636,200; U.S. Pat. No. 8,636,212; U.S. Pat. No. 8,636,215; U.S. Pat. No. 8,636,224; U.S. Pat. No. 8,638,806; U.S. Pat. No. 8,640,958; U.S. Pat. No. 8,640,960; U.S. Pat. No. 8,643,717; U.S. Pat. No. 8,646,692; U.S. Pat. No. 8,646,694; U.S. Pat. No. 8,657,200; U.S. Pat. No. 8,659,397; U.S. Pat. No. 8,668,149; U.S. Pat. No. 8,678,285; U.S. Pat. No. 8,678,286; U.S. Pat. No. 8,682,077; U.S. Pat. No. 8,687,282; U.S. Pat. No. 8,692,927; U.S. Pat. No. 8,695,880; U.S. Pat. No. 8,698,949; U.S. Pat. No. 8,717,494; U.S. Pat. No. 8,717,494; U.S. Pat. No. 8,720,783; U.S. Pat. No. 8,723,804; U.S. Pat. No. 8,723,904; U.S. Pat. No. 8,727,223; U.S. Pat. No. D702,237; U.S. Pat. No. 8,740,082; U.S. Pat. No. 8,740,085; U.S. Pat. No. 8,746,563; U.S. Pat. No. 8,750,445; U.S. Pat. No. 8,752,766; U.S. Pat. No. 8,756,059; U.S. Pat. No. 8,757,495; U.S. Pat. No. 8,760,563; U.S. Pat. No. 8,763,909; U.S. Pat. No. 8,777,108; U.S. Pat. No. 8,777,109; U.S. Pat. No. 8,779,898; U.S. Pat. No. 8,781,520; U.S. Pat. No. 8,783,573; U.S. Pat. No. 8,789,757; U.S. Pat. No. 8,789,758; U.S. Pat. No. 8,789,759; U.S. Pat. No. 8,794,520; U.S. Pat. No. 8,794,522; U.S. Pat. No. 8,794,525; U.S. Pat. No. 8,794,526; U.S. Pat. No. 8,798,367; U.S. Pat. No. 8,807,431; U.S. Pat. No. 8,807,432; U.S. Pat. No. 8,820,630; U.S. Pat. No. 8,822,848; U.S. Pat. No. 8,824,692; U.S. Pat. No. 8,824,696; U.S. Pat. No. 8,842,849; U.S. Pat. No. 8,844,822; U.S. Pat. No. 8,844,823; U.S. Pat. No. 8,849,019; U.S. Pat. No. 8,851,383; U.S. Pat. No. 8,854,633; U.S. Pat. No. 8,866,963; U.S. Pat. No. 8,868,421; U.S. Pat. No. 8,868,519; U.S. Pat. No. 8,868,802; U.S. Pat. No. 8,868,803; U.S. Pat. No. 8,870,074; U.S. Pat. No. 8,879,639; U.S. Pat. No. 8,880,426; U.S. Pat. No. 8,881,983; U.S. Pat. No. 8,881,987;

U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;

U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);
U.S. patent application Ser. No. 14/740,373 for CALIBRATING A VOLUME DIMENSIONER filed Jun. 16, 2015 (Ackley et al.);
U.S. patent application Ser. No. 14/742,818 for INDICIA READING SYSTEM EMPLOYING DIGITAL GAIN CONTROL filed Jun. 18, 2015 (Xian et al.);
U.S. patent application Ser. No. 14/743,257 for WIRELESS MESH POINT PORTABLE DATA TERMINAL filed Jun. 18, 2015 (Wang et al.);
U.S. patent application Ser. No. 29/530,600 for CYCLONE filed Jun. 18, 2015 (Vargo et al);
U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);
U.S. patent application Ser. No. 14/744,836 for CLOUD-BASED SYSTEM FOR READING OF DECODABLE INDICIA filed Jun. 19, 2015 (Todeschini et al.);
U.S. patent application Ser. No. 14/745,006 for SELECTIVE OUTPUT OF DECODED MESSAGE DATA filed Jun. 19, 2015 (Todeschini et al.);
U.S. patent application Ser. No. 14/747,197 for OPTICAL PATTERN PROJECTOR filed Jun. 23, 2015 (Thuries et al.);
U.S. patent application Ser. No. 14/747,490 for DUAL-PROJECTOR THREE-DIMENSIONAL SCANNER filed Jun. 23, 2015 (Jovanovski et al.); and
U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, it will be understood by those skilled in the art that each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined to provide further embodiments. These and other changes can be made to the present systems and methods in light of the above-detailed description. In general, in the following claims, the terms used should not be construed to limit the invention to the specific embodiments disclosed in the specification and the claims, but should be construed to include all voice-recognition systems that read in accordance with the claims. Accordingly, the invention is not limited by the disclosure, but instead its scope is to be determined entirely by the following claims.

What is claimed is:

1. A method for secure transmission of data between a first computer and a second computer, comprising:
    parsing, via a hardware processor of the first computer, an alphanumeric content of a source document into a plurality of source alphanumeric data elements;
    encrypting, via the hardware processor of the first computer, a plurality of the alphanumeric data elements into a corresponding plurality of encrypted source data elements;
    encoding, via the hardware processor of the first computer, each encrypted source data element into a source geometric data representation to produce a plurality of source geometric data representations;
    displaying on a display screen of the first computer, for a specified, limited period of display time, each source geometric data representation of the plurality;
    capturing via an imaging device of the second computer the displayed plurality of source geometric data representations, wherein the imaging device is configured to synchronize the capture of each source geometric data representations with the specified, limited period of display time for each respective source geometric data representation;
    decoding, via a hardware processor of the second computer, the captured plurality of source geometric data representations to obtain a respective plurality of received copies of the encrypted source data elements;
    decrypting via the hardware processor of the second computer the plurality of received copies of the encrypted source data elements to recover the plurality of source alphanumeric data elements; and
    combining on the second computer the plurality of alphanumeric data elements to form a received document based on the data transferred from the source document.

2. The method of claim 1, further comprising:
    encoding into a source geometric data representation of the plurality an indication of a placement of the associated source alphanumeric element within the source document.

3. The method of claim 2, wherein encoding the indication of placement comprises at least one of encoding, into the source geometric data representation, at least one of:
- a data field identifier of the associated source alphanumeric element;
- an identification of at least one of a table column, a table field name, or a table row of the associated source alphanumeric element;
- an identification of at least one of a spreadsheet column, a spreadsheet field name, or a spreadsheet row of the associated source alphanumeric element;
- an identification of a relative placement of the associated source alphanumeric element in relation to a second, different source alphanumeric element of the source alphanumeric document;
- an identification of a two-dimensional spatial placement of the associated source alphanumeric element on a designated page of the source document; and
- an ordinal number of the associated source alphanumeric element in the source document, said ordinal number indicating an ordering of the source alphanumeric element in relation to one or more other source alphanumeric elements.

4. The method of claim 1, further comprising:
displaying the plurality of source geometric data representations within an optically sealed environment, wherein each source geometric data representation of the plurality is viewable by the imaging device of the second computer but is otherwise shielded from view.

5. The method of claim 1, wherein:
encrypting, on the first computer, the plurality of alphanumeric data element into the corresponding plurality of encrypted source data elements comprises applying to each source alphanumeric data element a proprietary encryption method; and
decrypting, on the second computer, each encrypted source data element back to the corresponding source alphanumeric data element comprises applying a proprietary decryption method associated with the proprietary encryption method.

6. The method of claim 1, wherein encrypting each source alphanumeric data element into an encrypted source data element comprises:
randomly selecting, on the first computer, a selected encryption method from among a plurality of stored encryption methods;
conveying the random choice of encryption method to the second computer via an optical communication; and
decrypting, on the second computer, the encrypted source data elements using a decryption method associated with the randomly selected encryption method.

7. The method of claim 1, wherein encoding an encrypted source data element of the plurality into a source geometric data representation further comprises:
encoding via a proprietary geometric encoding method to encode the encrypted source data element into a proprietary geometric data representation; and
decoding via a corresponding proprietary geometric decoding method to recover the encrypted source data element.

8. The method of claim 1, further comprising:
applying a content filtering to the display screen, wherein the display screen is configured to:
display at least one of:
- the plurality of source geometric data representations, and
- an operating data pertaining to the display of the plurality of source geometric data representations; and
not display from the first computer display any other data, executable code, or other non-designated files which are stored on the first computer.

9. The method of claim 1, further comprising:
encoding an encryption key employed in an encryption process on the first computer into an encryption key geometric data form, wherein said encryption key comprises at least one of:
- a first encryption key for encrypting each source alphanumeric data element of the plurality into the encrypted source data element; and
- a second encryption key for encrypting the first encryption key prior to a communication of said first encryption key from the first computer to the second computer;
displaying said encryption key geometric data form on the display screen of the first computer;
capturing said encryption key geometric data form on the imaging device of the second computer; and
decoding said encryption key geometric data form on the second computer to obtain the encryption key.

10. The method of claim 1, further comprising:
converting a non-alphanumeric document to an alphanumeric data representation to be stored in a derived alphanumeric document on the first computer; and
employing the derived alphanumeric document as the source document, wherein the non-alphanumeric document is securely transferred to the second computer.

11. A method for secure transmission of data between a first computer and a second computer, comprising:
parsing, via a hardware processor of the first computer, an alphanumeric content of a source document to extract a source alphanumeric data element;
encoding, via the hardware processor of the first computer, the source alphanumeric data element into a source geometric data representation;
displaying on a display screen of the first computer, for a designated limited period of display time, the source geometric data representation;
capturing via an imaging device of the second computer, during the designated limited period of display time, the source geometric data representation which is displayed on the display screen of the first computer; and
decoding, via a hardware processor of the second computer, the source geometric data representation to obtain a received copy of the source alphanumeric data element.

12. The method of claim 11, further comprising parsing the alphanumeric content of the source document into a plurality of source alphanumeric data elements which, upon optical transfer to the second computer, are sufficient to reconstruct the original source document.

13. The method of claim 12, further comprising:
encoding into a source geometric data representation of the plurality an indication of a placement of the associated source alphanumeric element within the source document.

14. The method of claim 11, further comprising:
encrypting, via the hardware processor of the first computer, the source alphanumeric data element into an encrypted source data element, wherein the source geometric data representation comprises the encrypted source data element;

decoding, via a hardware processor of the second computer, the source geometric data representation to obtain a received copy of the encrypted source data element; and unencrypting, via the hardware processor of the second computer, the received copy of the encrypted source data element to recover the source alphanumeric data element.

15. The method of claim 14, wherein:

encrypting the source alphanumeric data element into the encrypted source data element comprises applying to the source alphanumeric data element a proprietary encryption method; and decrypting the encrypted source data element back to the corresponding source alphanumeric data element comprises applying a proprietary decryption method associated with the proprietary encryption method.

16. The method of claim 14, wherein encrypting the source alphanumeric data element into an encrypted source data element comprises:

randomly selecting, on the first computer, a selected encryption method from among a plurality of stored encryption methods;

conveying the random choice of encryption method to the second computer via an optical communication; and decrypting, on the second computer, the encrypted source data element using a decryption method associated with the randomly selected encryption method.

17. The method of claim 14, further comprising:

encoding an encryption key employed in the encryption process on the first computer into an encryption key geometric data form;

displaying said encryption key geometric data form on the display screen of the first computer;

capturing said encryption key geometric data form on the imaging device of the second computer; and decoding said encryption key geometric data form on the second computer to obtain the encryption key.

18. The method of claim 11, wherein encoding the source alphanumeric data element into the source geometric data representation further comprises:

encoding on the first computer via a proprietary geometric encoding method to encode the source alphanumeric data element into a proprietary geometric data representation; and decoding on the second computer via a corresponding proprietary geometric decoding method to recover the source alphanumeric data element.

19. The method of claim 11, further comprising:

displaying the source geometric data representation within an optically sealed environment, wherein the source geometric data representation is viewable by the imaging device but is otherwise shielded from viewing.

20. A method for securely transmitting a specified source document data between a first computer and a second computer while securely limiting data communication between the first computer and the second computer to only the specified document data, comprising:

configuring the first computer and the second computer for mutual data isolation, wherein both the first computer and the second computer are configured to exclude linkage and exclude mutual data communication via any general communications paths, said excluded general communications paths comprising at least and all of:

a wired connection, an optical cable connection, a radio frequency (RF) connection, an infrared connection, a cloud connection, and a portable data transfer media;

parsing, via a hardware processor of the first computer, an alphanumeric content of the specified source document into a plurality of source alphanumeric data elements;

encoding, via the hardware processor of the first computer, a plurality of the alphanumeric data elements into a corresponding plurality of the source geometric data representations;

displaying on a display screen of the first computer, each source geometric data representation of the plurality;

capturing via an imaging device of the second computer the plurality of source geometric data representations which are displayed on the display screen of the first computer;

decoding, via a hardware processor of the second computer, the captured plurality of source geometric data representations to obtain a corresponding plurality of received copies of the source alphanumeric data elements; and combining on the second computer the plurality of received alphanumeric data elements to form a received document based on the data transferred from the source document.

* * * * *